US006083609A

United States Patent [19]

Susaki et al.

[11] Patent Number: 6,083,609

[45] Date of Patent: Jul. 4, 2000

[54] INK JET RECORDING MATERIAL

[75] Inventors: Katsumitsu Susaki; Kazuyoshi Yamamoto; Satoshi Kaneko; Mitsuhiro Ikeda; Mikiya Sekine, all of Tokyo, Japan

[73] Assignee: Mitsubishi Paper Mills Limited, Tokyo, Japan

[21] Appl. No.: 08/952,496

[22] PCT Filed: Mar. 26, 1997

[86] PCT No.: PCT/JP97/01019

§ 371 Date: Nov. 26, 1997

§ 102(e) Date: Nov. 26, 1997

[87] PCT Pub. No.: WO97/35730

PCT Pub. Date: Oct. 2, 1997

[30] Foreign Application Priority Data

| | | | |
|---|---|---|---|
| Mar. 27, 1996 | [JP] | Japan | 8-072110 |
| Feb. 20, 1997 | [JP] | Japan | 9-036683 |

[51] Int. Cl.[7] ..... B32B 3/00

[52] U.S. Cl. ..... 428/195; 428/478.2; 428/478.4; 428/206; 428/323; 428/688

[58] Field of Search ..... 428/195, 478.2, 428/478.4, 357, 206, 292.1, 323, 341, 688, 484, 207, 411.1

[56] References Cited

U.S. PATENT DOCUMENTS

| | | | |
|---|---|---|---|
| 4,564,560 | 1/1986 | Tani et al. | 428/411.1 |
| 4,946,741 | 8/1990 | Aono et al. . | |
| 5,279,885 | 1/1994 | Ohmori et al. | 428/195 |

FOREIGN PATENT DOCUMENTS

| | | | |
|---|---|---|---|
| WO 87/05265 | 9/1987 | WIPO . | |
| WO 94/02325 | 2/1994 | WIPO . | |
| WO 95/28285 | 10/1995 | WIPO | B41M 5/00 |

*Primary Examiner*—William Krynski

*Assistant Examiner*—Hong J. Xu

*Attorney, Agent, or Firm*—Oblon, Spivak, McClelland, Maier & Neustadt, P.C.

[57] ABSTRACT

An ink jet recording material having an ink-absorbing layer containing a gelatin crosslinked with at least one compound selected from the group consisting of compounds of the following general formulas:

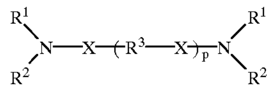

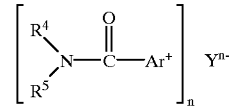

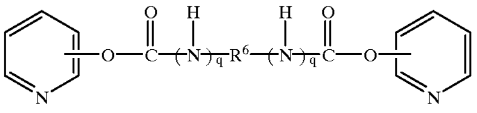

wherein X is a bivalent residue having a carbonyl or sulfonyl group bonded to an N atom, $R^1$, $R^2$, $R^4$ and $R^5$ are monovalent residues, $R^3$ and $R^6$ are bivalent residues, p and q are integers of 0 or 1, $Ar^+$ is a heteroaromatic group having a quaternary nitrogen atom, n is an integer of 1 to 3, and $y^{n-}$ is an n-valent anion.

31 Claims, No Drawings

INK JET RECORDING MATERIAL

TECHNICAL FIELD

The present invention relates to a recording material used for a printer or plotter employing ink jet recording system, and particularly relates to an ink jet recording material having a photographic paper-like gloss required for color recording or a highly transparent ink jet recording material usable as an OHP film.

BACKGROUND ART

Recently, an ink jet printer or plotter has been remarkably improved, and a high quality image of full color can be easily obtained. Thus, development of an ink jet recording material other than a conventional woodfree paper or coated paper for ink jet recording has been eagerly demanded.

Ink jet recording system comprises jetting very fine ink drops onto a recording material such as paper by various actions to form images, letters and the like on the recording material. An ink jet recording or plotter attracts a good deal of public attention since it has various characteristics that it is excellent in high-speed printability and low noisiness, that flexibility of a pattern to be recorded is large, that development-fixing step is not required, and further that a complex image can be precisely and rapidly formed. Particularly, it has been rapidly spread for various uses including a hard copy-producing device of image information of letters and various drawings prepared by a computer. Further, a multi-color recording can be easily carried out by using a plurality of ink nozzles. Multi-color ink jet system can provide a satisfactory color image comparable to those formed by multi-color printing system or color photographic system, and can provide copies at a lower cost as compared with printing technique or photographic technique when the copying number is small, and has been therefore widely applied.

Recently, an ink jet printer which provides a high quality image comparable to a silver salt photograph image is cheaply commercially available. An ink jet recording material is very low cost although it provides an image of the same quality as compared with silver salt photographic system, and this is a great economical merit for traders to frequently replace display images of a trade sample or an sign board which requires images of large area. Further, the ink jet recording system has an advantage that an image can be easily amended in respect to a color arrangement or layout by checking an image formed on a computer or its printed material, and it is quite impossible for conventional silver salt photographic system to enjoy this advantage.

An ink jet printer or plotter is lately noticeable to be used for preparation of a color artwork in printing field which requires a satisfactory image quality close to a photograph, or to be used for full color image recording such as output of a design image in design department or to be used for recording image information prepared by a computer on a transparent recording material which is then used for an OHP (overhead projector) in presentation of convention.

The above-mentioned demands for an ink jet printer or plotter or demands for a recording material are varied in proportion to a spread of an ink jet printer or plotter. For example, a recording material provided with an excellent outer appearance having a high glossy surface comparable to a silver salt color photograph or a highly transparent recording material usable as an OHP film, is demanded.

An effort has been made in respect to a device or an ink composition so that a usual printing or writing woodfree paper or coated paper can be used as a recording material for ink jet recording system. However, in proportion to an improvement in performances in respect to high speed, high precision or full coloring or in proportion to a spread of use of an ink jet recording device, higher performances are required also for a recording material. That is, the recording material is required to provide a light and clear color tone, to rapidly absorb an ink or to prevent bleeding of ink even when printed dots are overlapped. Particularly, in the case of color recording, not only single printing but also overprinting of yellow, magenta, cyan and black inks is conducted, and a very high performance is required since an ink deposition amount becomes large.

As a conventional ink Jet recording material, there has been proposed a recording material obtained by coating a silicon-containing pigment such as silica together with an aqueous binder on a paper surface, for example, as disclosed in JP-A-55-51583, JP-A-56-157, JP-A-57-107879, JP-A-57-107880, JP-A-59-230787, JP-A-62-160277, JP-A-62-184879, JP-A-62-183382 and JP-A-64-11877. An inorganic pigment such as silica has a large oil-absorbing capacity, and a recording material containing the inorganic pigment such as silica as the main component in an ink-absorbing layer is almost satisfactory in respect to an ink-absorbing capacity and an ink-absorbing speed, but there is a disadvantage that a recording material having a satisfactory surface gloss can not be obtained. When colloidal silica is used in place of silica for a purpose of obtaining a satisfactory gloss as disclosed in the above-mentioned JP-A-56-157, an ink-absorbing property becomes unsatisfactorily poor. JP-A-3-215082, JP-A-4-67986 and JP-A-5-32037 disclose a method for preparing a transparent recording material by coating a fine alumina sol together with a water-soluble binder on a support surface, but an ink-absorbing property is poor unless the ratio of the alumina sol (pseudoboehmite) to the binder in the coated layer is raised. However, the coated layer having a high pigment ratio easily generates cracking on the coated film when drying, and in order to obtain a satisfactory ink-absorbing capacity, the coated amount must be at least $20/m^2$, thus requiring a thick coating. Further, this provides such a problem that it is hard to control drying conditions in practical production. Still further, since a coating film strength is weak, an ink jet recorded image is easily peeled or damaged by being rubbed, and curl easily occurs after printing. Furthermore, since a transparency of the coated film is poor, a glossy surface can not be obtained even when a support having a high glossy surface is used. On the other hand, JP-A-6-320857 discloses an ink jet recording material having a glossy surface that is a cast-finished paper obtained by cast-finishing a coated paper while the coated layer is wet, but its surface gloss is very low as compared with a silver salt photograph and the quality of the silver salt photograph can not be obtained.

As mentioned above, in order to form an ink-absorbing layer having a high transparency or gloss, the above-mentioned various inorganic pigments are not employed or their amounts are limited when used, and therefore an ink-absorbing property is often provided by a resin layer formed on a support surface. Examples of the resins conventionally used for this purpose include polyvinyl pyrrolidone and vinyl pyrrolidone-vinyl acetate copolymer as disclosed in JP-A-57-38185 and JP-A-62-184879, a resin composition mainly containing polyvinyl alcohol as disclosed in JP-A-60-168651, JP-A-60-171143 and JP-A-61-134290, vinyl alcohol-olefin or styrene-maleic anhydride copolymer as disclosed in JP-A-60-234879, a crosslinked product of polyethylene oxide and isocyanate as disclosed in JP-A-61-74879, a mixture of carboxymethyl cellulose and polyethylene oxide as disclosed in JP-A-61-181679, a grafted polymer of polyvinyl alcohol with methacrylamide as disclosed in JP-A-61-132377, an acrylic polymer having a carboxyl group as disclosed in JP-A-62-220383, a polyvinyl acetal type polymer as disclosed in JP-A-4-214382 and various ink-absorbing polymers such as crosslinkable acrylic polymers as disclosed in JP-A-4-282282 and JP-A-4-285650. However, all of these ink-absorbing layer films are poor in water-resistance, and therefore, the ink-absorbing layer is dissolved by a solvent of ink when absorbing the ink. Consequently, when a printed part which is not fully dried is touched with any of other materials, the ink-absorbing layer film is broken and recording is damaged or the ink dye is attached to clothes. Further, the ink-absorbing layer film is dissolved with waterdrops and recording is damaged or the printed part provides an unpleasant feeling due to tackiness when touched with a hand. Still further, since contact between the ink-absorbing layer and other materials causes so-called blocking, the recorded images of the printed parts and the ink-absorbing layer films are sometimes broken.

An object of the present invention is to provide a recording material used for a printer or plotter employing ink jet recording system, and particularly to provide an ink jet recording material having a photographic paper-like gloss which is highly demanded for color recording or a highly transparent ink jet recording material usable as an OHP film.

Further, the present invention provides a recording film excellent in water-resistance, which prevents an ink-absorbing layer film from being dissolved with water drops or the like and also prevents a dye from bleeding from the film, a recording material which does not have such a tackiness on a printed part as to provide an unpleasant feeling when touched with a hand, and a recording material excellent in antiblocking property so that a recorded image on a printed part and an ink-absorbing layer film are not damaged by blocking.

The above-mentioned objects of the present invention can be accomplished by the following means, i.e. an ink jet recording material provided with an ink-absorbing layer on a support, wherein the ink-absorbing layer contains a gelatin crosslinked by at least one compound selected from the group consisting of compounds expressed by the following general formula 1, thereby providing a satisfactory photographic paper-like gloss a satisfactory transparency usable for an OHP, a high ink-absorbing speed and an excellent water-resistance.

1

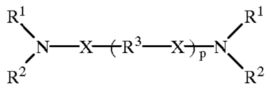

In the above general formula 1, X is a bivalent residue having a carbonyl or sulfonyl group bonded with an N atom; each of $R^1$ and $R^2$ is a monovalent residue which may be the same or different, or $R^1$ and $R^2$ may bond each other to form a substituted or unsubstituted ring; $R^3$ is a bivalent residue; and p is an integer of 0 or 1.

Particularly, among the compounds expressed by the general formula 1, compounds expressed by any of the following general formulas 2 to 4 are preferable.

2

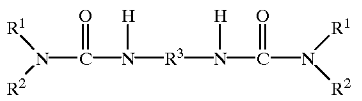

In the above general formula 2, $R^1$ to $R^3$ are as defined in the above general formula 1.

3

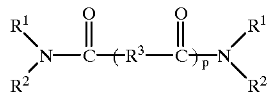

In the above general formula 3, $R^1$ to $R^3$ and p are as defined in the above general formula 1.

4

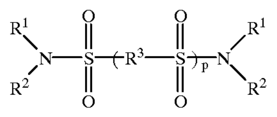

In the above general formula 4, $R^1$ to $R^3$ and p are as defined in the above general formula 1.

The object of the present invention can also be accomplished by an ink jet recording material provided with an ink-absorbing layer on a support, wherein the ink-absorbing layer contains a gelatin crosslinked by at least one compound selected from the group consisting of compounds expressed by the following general formula 5.

5

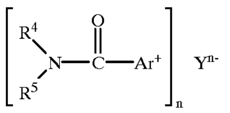

In the above general formula 5, $Ar^+$ is a substituted or unsubstituted 5-membered or 6-membered heterocyclic aromatic group having a quaternary nitrogen atom; n is an integer of 1 to 3; $Y^{n-}$ is a n-valent anion; and each of $R^4$ and $R^5$ is a monovalent residue which may be the same different or $R^4$ and $R^5$ may bond each other to form a substituted or unsubstituted ring.

Further, the object of the present invention can be accomplished by an ink jet recording material provided with an ink-absorbing layer on a support, wherein the ink-absorbing layer contains a gelatin crosslinked by at least one compound selected from the group consisting of compounds expressed by the following general formula 6.

6

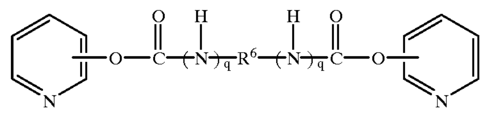

In the above general formula 6, $R^6$ is a bivalent residue and q is an integer of 0 or 1.

Still further, in the ink jet recording material provided with an ink-absorbing layer on a support, an ink-absorbing property can be more improved by providing an ink-absorbing layer containing at least one hydrophilic polymer in addition to a gelatin crosslinked with the above-mentioned crosslinking agent. A hydrophilic polymer containing at least one monomer selected from the group consisting of acrylamide, N,N-dimethylacrylamide, N,N-diethylacrylamide, N-isopropylacrylamide, acryloylmorpholine and N-vinyl-2-pyrrolidone as a constitution unit or a water-soluble cellulose ether is preferable in view of ink-absorbing property.

Further, in order to enhance a fixing property of a dye, it is preferable that these hydrophilic polymers contain at least one ammonium salt monomer as a constitution unit.

On the other hand, an ink jet recording material having a satisfactory photographic paper-like gloss, a satisfactory transparency usable for an OHP, a high ink-absorbing speed and an excellent water-resistance can be provided by incorporating a gelatin grafted with a hydrophilic monomer into an ink-absorbing layer provided on a support.

By incorporating a gelatin grafted with a hydrophilic monomer into an ink-absorbing layer, the tackiness of a printed part can be made lower.

In view of an ink-absorbing property, a gelatin grafted with a hydrophilic monomer contains preferably at least one hydrophilic monomer selected from the group consisting of acrylamide, N,N-dimethylacrylamide, N,N-diethylacrylamide, N-isopropylacrylamide, acryloylmorpholine and N-vinyl-2-pyrrolidone as a constitution unit.

Further, in order to enhance a fixing property of a dye, it is preferable that a grafted gelatin contains at least one ammonium salt monomer as a constitution unit.

Still further, in order to enhance a water-resistance, it is preferable that a grafted gelatin is crosslinked with a crosslinking agent. It is particularly preferable in view of an ink-absorbing property and a film strength that the crosslinking agent is at least one member selected from the group consisting of compounds expressed by any of the above general formulas 1 to 6.

On the other hand, by incorporating an organic polymer fine particle comprising a resin having a refractive index of at most 1.7 into an ink-absorbing layer, an ink jet recording material effectively preventing a recorded image from being damaged by blocking without substantially losing a gloss and a transparency can be provided.

Further, by incorporating an inorganic pigment fine particle having a refractive index of at most 1.7 into an ink-absorbing layer, an ink jet recording material preventing a recorded image from being damaged by contacting with other materials without substantially losing a gloss and a transparency can be provided. An amorphous silica having an average agglomerate particle size in the range of from 2 $\mu$m to 20 $\mu$m is preferable as the inorganic pigment fine particle since it does not impair a gloss and a transparency.

On the other hand, by providing an ink-absorbing layer formed by coating a coating solution on a support and drying the coated solution without gelling, a recording material having a more satisfactory ink-absorbing property can be provided.

A technique for crosslinking gelatin with a crosslinking agent is already practically used in various fields mainly including a photographic industry. Further, heretofore, many compounds are known to be effective as a crosslinking agent for gelatin.

Examples of the crosslinking agent include aldehyde type compounds such as formaldehyde, glutaraldehyde or succinaldehyde, those disclosed in U.S. Pat. No. 3,288,775 and No. 2,732,303 and British Patents No. 974,723 and No. 1,167,207, compounds having a reactive halogen such as 2-hydroxy-4,6-dichloro-triazine salt, ketone compounds such as diacetylcyclopentanedione, divinylsulfone, 5-acetyl-1,3-diacryloyl, compounds having a reactive olefin as disclosed in U.S. Pat. No. 3,635,718 and No. 2,232,763 and British Patent No. 994,869, N-hydroxymethylphthalimide, N-methylol compounds as disclosed in U.S. Pat. No. 2,732,316 and No. 2,586,168, isocyanates as disclosed in U.S. Pat. No. 3,103,437, aziridine compounds as disclosed in U.S. Pat. No. 3,017,280 and No. 2,983,611, acid derivatives as disclosed in U.S. Pat. No. 2,725,294 and No. 2,725,295, carbodiimide type compounds as disclosed in U.S. Pat. No. 3,100,704, epoxy compounds as disclosed in U.S. Pat. No. 3,091,537, isoxazole type compounds as disclosed in U.S. Pat. No. 3,321,313 and No. 3,543,292, halogenocarboxyaldehydes such as mucochloric acid, dioxane derivatives such as dihydroxydioxane and dichlorodioxane, blocked isocyanates as disclosed in JP-A-53-113856, active acyl compounds, inorganic crosslinking agents such as chromium alum and chromium trichloride, and the like.

Substantially all of these crosslinking agents were developed in the field of a photographic industry, and were developed for the purposes of improving a mechanical strength of a film and controlling water-absorption. Therefore, it is usual that an ink containing a large amount of water for ink jet recording is hardly absorbed when gelatin is crosslinked by these crosslinking agents.

A property required for ink jet recording is to impart a water-resistance to an ink-absorbing layer without impairing an ink-absorptivity of the ink-absorbing layer to absorb an ink containing a large amount of water for ink jet recording.

An advantage of using gelatin is that tackiness of the surface of an ink-absorbing layer containing gelatin is small regardless of an unprinted part or a printed part. When an ink-absorbing layer is constituted by other natural polymer or synthetic polymer, a water content is liable not to evaporate by drying and a high boiling point solvent such as glycerin in the ink component remains on the surface of the ink-absorbing layer, thus providing a large tackiness on a printed part absorbing ink on the ink-absorbing layer surface. However, since gelatin contains a hydrophobic group and a hydrophilic group in good balance, it absorbs and holds a non-volatile solvent such as glycerin. Also, gelatin provides a very strong film strength and is swollen with an ink component but is not eluted, and therefore tackiness of a printed part on the surface of an ink-absorbing layer is small.

Further, an ink-absorbing layer containing gelatin causes a volume change of at least twice as large as a dry film thickness when absorbing a water content, and accordingly it has a large ink-absorbing capacity.

As a result of earnest study, the present inventors could provide a satisfactory ink jet recording material by crosslinking gelatin with a specific crosslinking agent, which imparts a water-resistance to an ink-absorbing layer without impairing an ink-absorptivity and protects a recorded image from being damaged by breakage of a film of the ink-absorbing layer with water drops or the like.

BEST MODE FOR CARRYING OUT THE INVENTION

Preferable examples of $R^3$ of the above general formulas 1 to 4 and $R^6$ of the above general formula 6 are illustrated by the following groups, but the present invention should not be limited thereto.

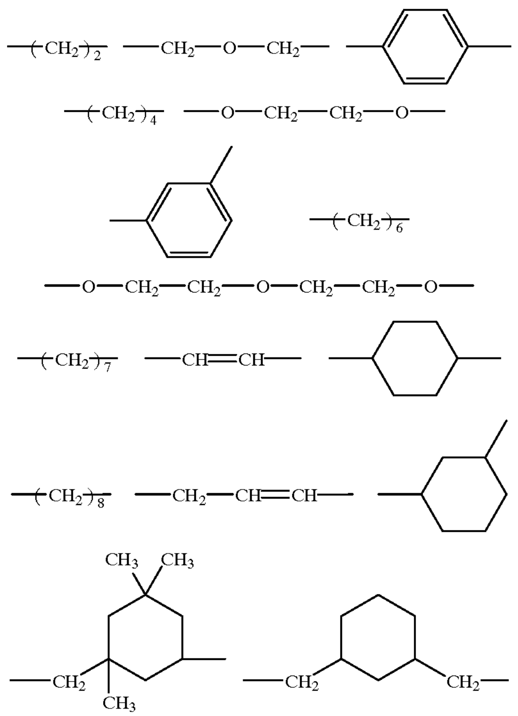

-continued

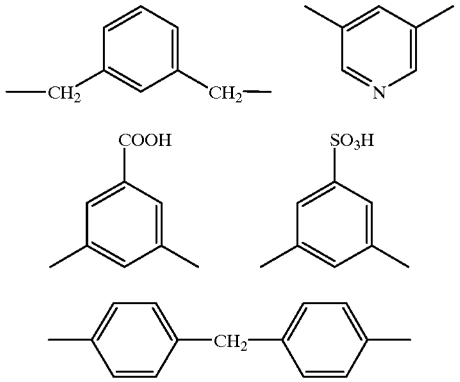

Preferable examples of compounds represented by the above formula 2 are listed in the following Tables 1 to 5, but the present invention should not be limited thereto.

TABLE 1

| Compound No. | 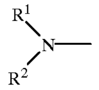 | $-R^3-$ |
|---|---|---|
| (1-1) | 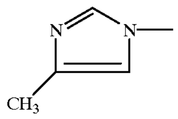 | $-(CH_2)_4-$ |
| (1-2) | 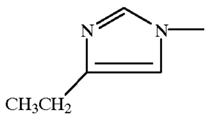 | $-(CH_2)_4-$ |
| (1-3) | 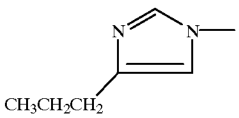 | $-(CH_2)_4-$ |
| (1-4) | 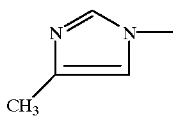 | $-(CH_2)_6-$ |
| (1-5) | 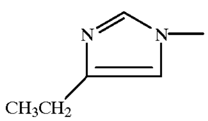 | $-(CH_2)_6-$ |
| (1-6) | 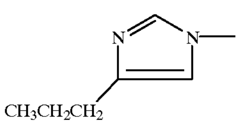 | $-(CH_2)_6-$ |

TABLE 1-continued
| Compound No. | 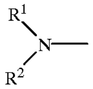 | $—R^3—$ |
|---|---|---|
| (1-7) | 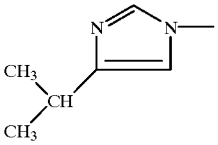 | $—(CH_2)_6—$ |
TABLE 2
| Compound No. | 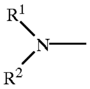 | $—R^3—$ |
|---|---|---|
| (2-1) | 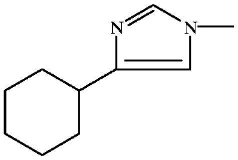 | $—(CH_2)_6—$ |
| (2-2) | 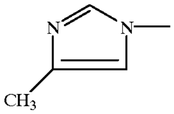 | 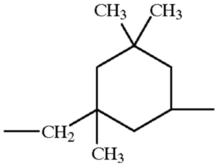 |
| (2-3) | 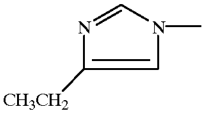 | 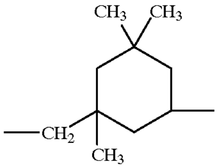 |
| (2-4) | 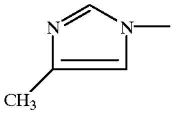 | 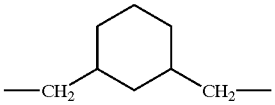 |
| (2-5) | 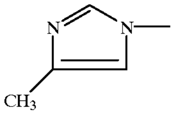 | 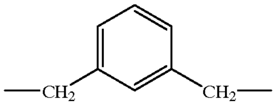 |
| (2-6) | 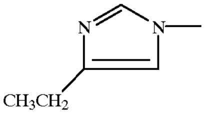 | 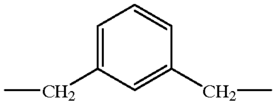 |

TABLE 3
| Compound No. | 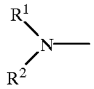 | —$R^3$— |
|---|---|---|
| (3-1) | 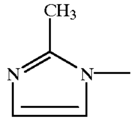 | 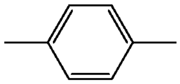 |
| (3-2) | 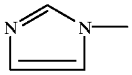 | 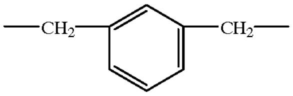 |
| (3-3) | 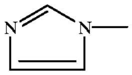 | $-(CH_2)_6-$ |
| (3-4) | 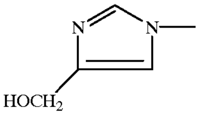 | $-(CH_2)_6-$ |
| (3-5) | 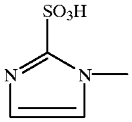 | $-(CH_2)_6-$ |
| (3-6) | 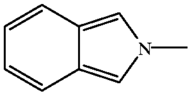 | $-(CH_2)_6-$ |
| (3-7) | 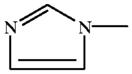 | 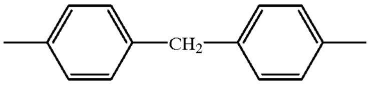 |
TABLE 4
| Compound No. | 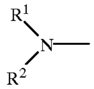 | —$R^3$— |
|---|---|---|
| (4-1) | 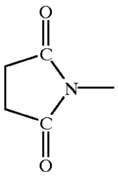 | 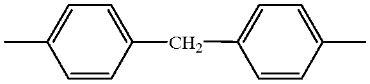 |

TABLE 4-continued
| Compound No. | 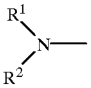 | —$R^3$— |
|---|---|---|
| (4-2) | 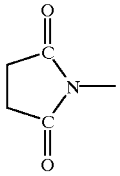 | —$(CH_2)_6$— |
| (4-3) | 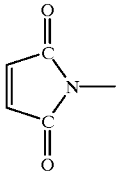 | —$(CH_2)_6$— |
| (4-4) | 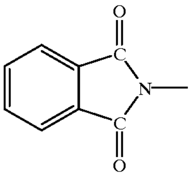 | —$(CH_2)_6$— |
| (4-5) | 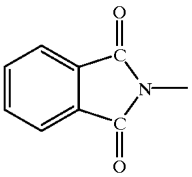 | —$(CH_2)_6$— |
TABLE 5
| Compound No. | 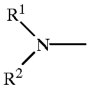 | —$R^3$— |
|---|---|---|
| (5-1) | 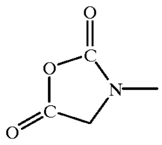 | —$(CH_2)_6$— |
| (5-2) | 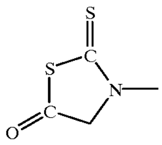 | —$(CH_2)_6$— |
| (5-3) | 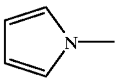 | —$(CH_2)_6$— |
TABLE 5-continued
| Compound No. | 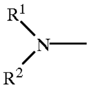 | —$R^3$— |
|---|---|---|
| (5-4) | 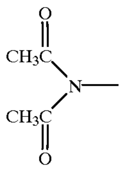 | —$(CH_2)_6$— |
| (5-5) | 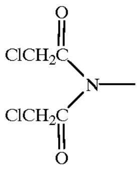 | —$(CH_2)_6$— |

TABLE 5-continued
| Compound No. | 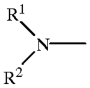 | —$R^3$— |
|---|---|---|
| (5-6) | 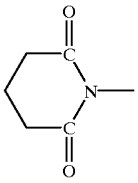 | —$(CH_2)_4$— |
Preferable examples of compounds represented by the above formula 3 are listed in the following Tables 6 to 8, but the present invention should not be limited thereto.
TABLE 6
| Compound No. | 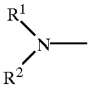 | —$R^3$— | p |
|---|---|---|---|
| (6-1) | 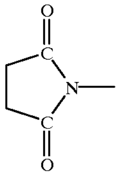 | —$(CH_2)_4$— | 1 |
| (6-2) | 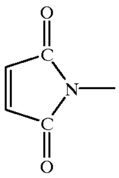 | —$(CH_2)_4$— | 1 |
| (6-3) | 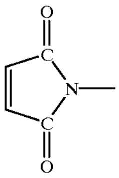 | —$(CH_2)_2$— | 1 |
| (6-4) | 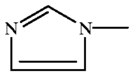 | —$(CH_2)_4$— | 1 |
| (6-5) | 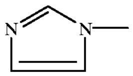 | —CH═CH— | |
| (6-6) | 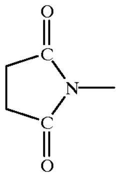 | —$(CH_2)_8$— | 1 |
TABLE 7
| Compound No. | 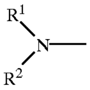 | —$R^3$— | p |
|---|---|---|---|
| (7-1) | 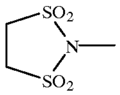 | —$(CH_2)_4$— | 1 |
| (7-2) | 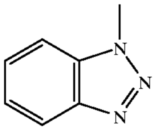 | —$(CH_2)_4$— | 1 |
| (7-3) | 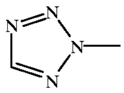 | —$(CH_2)_4$— | 1 |
| (7-4) | 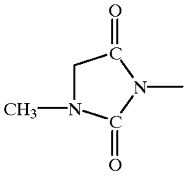 | —$(CH_2)_8$— | 1 |
| (7-5) | 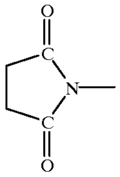 | 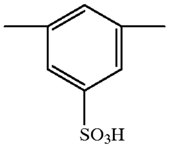 | 1 |
TABLE 8
| Compound No. | 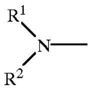 | —$R^3$— | p |
|---|---|---|---|
| (8-1) | 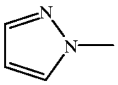 | — | 0 |
| (8-2) | 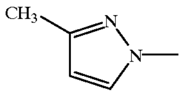 | — | 0 |
| (8-3) | 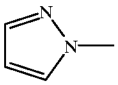 | —$(CH_2)_4$— | 1 |
| (8-4) | 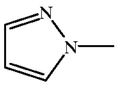 | —$CH_2OCH_2$— | 1 |

TABLE 8-continued

| Compound No. | 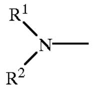 | —$R^3$— | p |
|---|---|---|---|
| (8-5) | 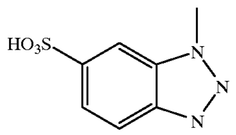 | —$(CH_2)_4$— | 1 |
| (8-6) | 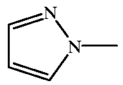 | —$(CH_2)_6$— | 1 |

Preferable examples of compounds represented by the above formula 4 are listed in the following Table 9, but the present invention should not be limited thereto.

TABLE 9

| Compound No. | 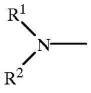 | —$R^3$— | p |
|---|---|---|---|
| (9-1) | 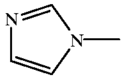 | — | 0 |
| (9-2) | 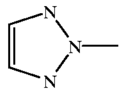 | — | 0 |
| (9-3) | 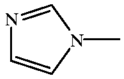 | —$(CH_2)_4$— | 1 |
| (9-4) | 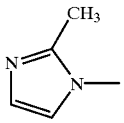 | —$(CH_2)_7$— | 1 |
| (9-5) | 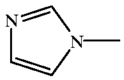 | 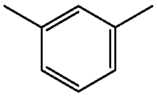 | 1 |

Preferable examples of compounds represented by the above formula 5 are listed in the following Tables 10 to 13, but the present invention should not be limited thereto. Also, examples of $y^{n-}$ in the above general formula 5 include anions such as chlorine ion, bromine ion, iodine ion, sulfonic acid anion, alkylsulfonic acid anion, acetic acid ion and alkylcarboxylic acid anion salts, but the present invention should not be limited thereto.

TABLE 10

| Compound No. | 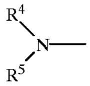 | —$Ar^+$ | $Y^{n-}$ |
|---|---|---|---|
| (10-1) | 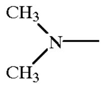 | 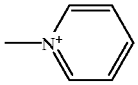 | $Cl^-$ |
| (10-2) | 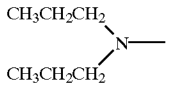 | 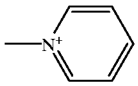 | $Cl^-$ |
| (10-3) | 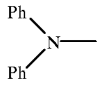 | 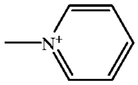 | $Cl^-$ |
| (10-4) | 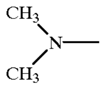 | 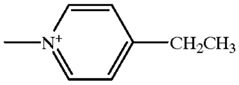 | $Cl^-$ |
| (10-5) | 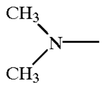 | 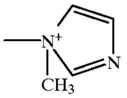 | $Cl^-$ |
| (10-6) | 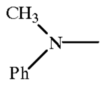 | 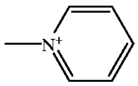 | $Cl^-$ |
| (10-7) | 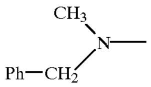 | 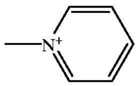 | $Cl^-$ |
| (10-8) | 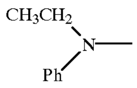 | 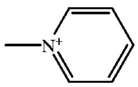 | $Cl^-$ |

TABLE 11

| Compound No. | 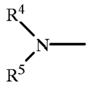 | —$Ar^+$ | $Y^{n-}$ |
|---|---|---|---|
| (11-1) | 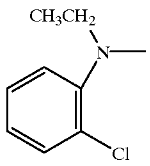 | 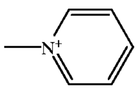 | $Cl^-$ |
| (11-2) | 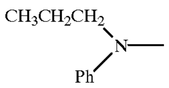 | 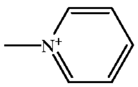 | $Br^-$ |
| (11-3) | 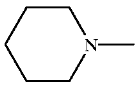 | 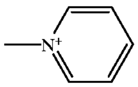 | $Cl^-$ |

TABLE 11-continued
| Compound No. | 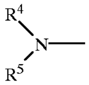 | $—Ar^+$ | $Y^{n-}$ |
|---|---|---|---|
| (11-4) | 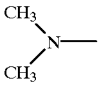 | 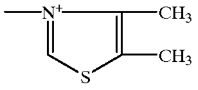 | $Cl^-$ |
| (11-5) | 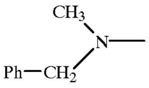 | 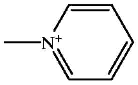 | $Cl^-$ |
| (11-6) | 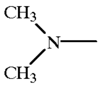 | 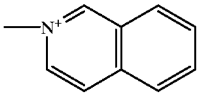 | $Cl^-$ |
| (11-7) | 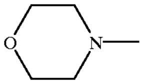 | 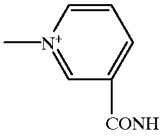 | $Cl^-$ |
TABLE 12
| Compound No. | 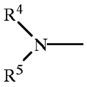 | $—Ar^+$ | $Y^{n-}$ |
|---|---|---|---|
| (12-1) | 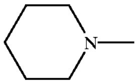 | 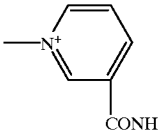 | $Cl^-$ |
TABLE 12-continued
| Compound No. | 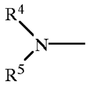 | $—Ar^+$ | $Y^{n-}$ |
|---|---|---|---|
| (12-2) | 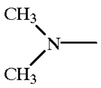 | 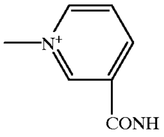 | $Cl^-$ |
| (12-3) | 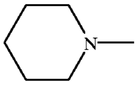 | 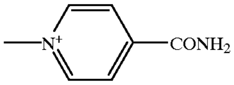 | $Cl^-$ |
| (12-4) | 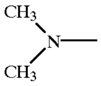 | 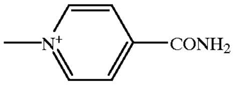 | $Cl^-$ |
| (12-5) | 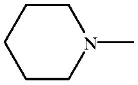 | 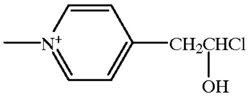 | $Cl^-$ |
| (12-6) | 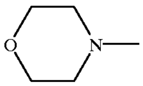 | 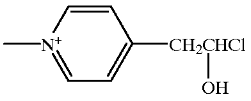 | $Cl^-$ |
| (12-7) | 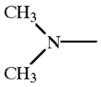 | 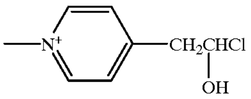 | $Cl^-$ |

TABLE 13
| Compound No. | 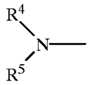 | —$Ar^+$ | $Y^{n-}$ |
|---|---|---|---|
| (13-1) | 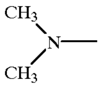 | 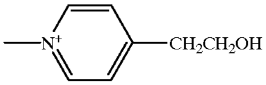 | $Cl^-$ |
| (13-2) | 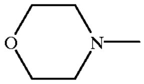 | 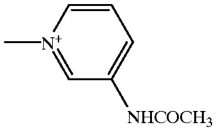 | $Cl^-$ |
| (13-3) | 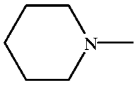 |  | $Cl^-$ |
| (13-4) | 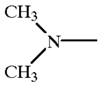 |  | $Cl^-$ |
| (13-5) | 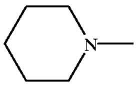 | 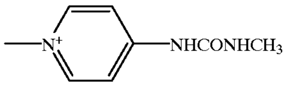 | $Cl^-$ |
| (13-6) | 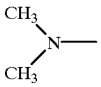 | 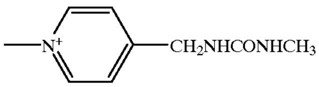 | $Cl^-$ |
| (13-7) | 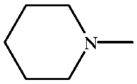 | 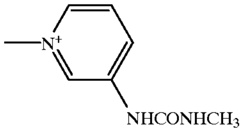 | $Cl^-$ |
Preferable examples of compounds represented by the above formula 6 are listed in the following Tables 14 and 15, but the present invention should not be limited thereto.
TABLE 14
| Compound No. | 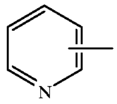 | —$R^6$— | q |
|---|---|---|---|
| (14-1) | 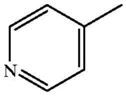 | 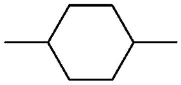 | 1 |
| (14-2) | 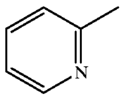 | 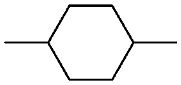 | 1 |

TABLE 14-continued
| Compound No. | 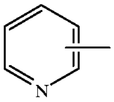 | $—R^6—$ | q |
|---|---|---|---|
| (14-3) | 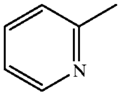 | $—(CH_2)_6—$ | 1 |
| (14-4) | 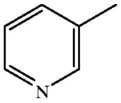 | $—(CH_2)_6—$ | 1 |
| (14-5) | 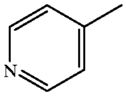 | $—(CH_2)_6—$ | 1 |
| (14-6) | 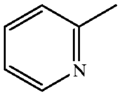 | 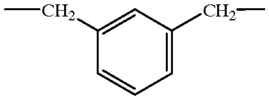 | 1 |
| (14-7) | 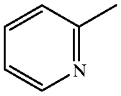 | 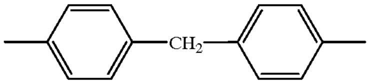 | 1 |
| (14-8) | 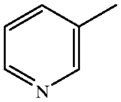 | $—(CH_2)_2—$ | 0 |
TABLE 15
| Compound No. | 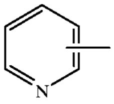 | $—R^6—$ | q |
|---|---|---|---|
| (15-1) | 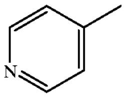 | $—(CH_2)_2—$ | 0 |
| (15-2) | 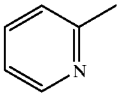 | $—(CH_2)_2—$ | 0 |
| (15-3) | 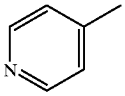 | $—(CH_2)_4—$ | 0 |
| (15-4) | 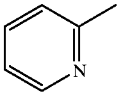 | $—(CH_2)_4—$ | 0 |
TABLE 15-continued
| Compound No. | 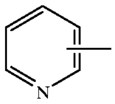 | $—R^6—$ | q |
|---|---|---|---|
| (15-5) | 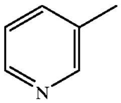 | $—(CH_2)_4—$ | 0 |
| (15-6) | 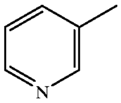 | —CH═CH— | 0 |
| (15-7) | 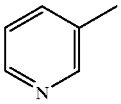 | $—(CH_2)_8—$ | 0 |

TABLE 15-continued

| Compound No. | 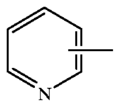 | —$R^6$— | q |
| --- | --- | --- | --- |
| (15-8) | 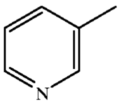 | 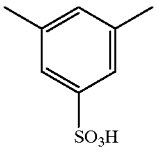 | 0 |

These crosslinking agents are added to gelatin preferably in an amount of from 0.1 to 10 wt %, more preferably from 0.2 to 5 wt %, to the weight of gelatin. If the amount of a crosslinking agent is less than 0.1 wt %, crosslinking is unsatisfactory and a satisfactory water-resistance can not be obtained. On the other hand, if the amount of a crosslinking agent is larger than 10 wt %, crosslinking proceeds too much to form such a highly crosslinked film as to extremely lower an ink-absorbing capacity of an ink-absorbing layer and consequently to cause bleeding of the ink on a solid-printed part.

Also, an ink for ink jet recording generally contains water in an amount of from 70 to 90 wt %, but also generally contains an alcohol type high boiling point solvent such as diethylene glycol, triethylene glycol or glycerin in order to prevent clogging of a head by drying and to adjust a surface tension of the ink. Therefore, the ink-absorbing layer must absorb also these high boiling point solvents.

In order to effectively absorb these high boiling point solvents, it is preferable for an ink-absorbing layer to contain at least one hydrophilic polymer in addition to gelatin crosslinked with a crosslinking agent.

As the hydrophilic polymer, a hydrophilic polymer containing at least one monomer selected from the group consisting of acrylamide, N,N-dimethylacrylamide, N,N-diethylacrylamide, N-isopropylacrylamide, acryloylmorpholine and N-vinyl-2-pyrrolidone as a constitution unit is preferable since it effectively absorbs a high boiling point solvent generally contained in an ink for ink jet recording, but the present invention is not limited thereto.

Also, a water-soluble cellulose ether can be preferably used as the hydrophilic polymer since it effectively absorbs a high boiling point solvent generally contained in an ink for ink jet recording.

Examples of the cellulose ether generally include alkyl ether, hydroxyalkyl ether and carboxyalkyl ether derived from natural celluloses, and are classified into a water-soluble cellulose ether and an organic solvent-soluble cellulose ether.

In the present invention, the water-soluble cellulose means cellulose ethers soluble in hot water or cold water, such as sodium salt of carboxymethyl cellulose, methyl cellulose, methylhydroxyethyl cellulose, methylhydroxypropyl cellulose and the like, but the present invention should not be limited thereto.

If the content of these hydrophilic polymers in an ink-absorbing layer is too large, the water-resistance of a film becomes poor, and on the other hand, if their content is too small, an effect of absorbing a high boiling point solvent becomes poor. Therefore, the total content of a hydrophilic polymer is preferably from 5 to 300 wt %, more preferably from 50 to 200 wt %, to the weight of gelatin.

Further, a dye used for ink jet printing generally has an anionic group such as a sulfonic acid group or a carboxylic acid group, and when a polymer having a cationic group is present in an ink-absorbing layer, the polymer and the dye are chemically bonded by counter ion exchange. Therefore, when a hydrophilic polymer contains at least one ammonium salt monomer as a constitution unit, fixation of a dye is enhanced and damage of a recorded image by bleeding of the dye from a film by the action of waterdrops can be prevented.

Gelatin is an amphoteric electrolyte having an isoelectric point, which comprises 18 kinds of amino acids. Therefore, gelatin can be any of cation type and anion type depending on pH condition. Thus, gelatin at a pH of lower than an isoelectric point is cation type, and gelatin at a pH of higher than an isoelectric point is anion type.

Acid method gelatin generally has a higher isoelectric point than alkali method gelatin, and therefore it becomes easily cation type. As mentioned above, a dye used for ink jet recording generally has an anionic group such as a sulfonic acid group or a carboxylic acid group. Accordingly, if gelatin in an ink-absorbing layer is cation type, the dye can be chemically bonded therewith. Therefore, if acid method gelatin is used at a pH of lower than an isoelectric point, fixation of a dye is enhanced and damage of a recorded image by bleeding of the dye from a film by the action of waterdrops can be effectively prevented.

On the other hand, an ink jet recording material having a satisfactory photographic paper-like gloss, a high transparency usable for an OHP, a high ink-absorbing speed and an excellent water-resistance could be provided also by incorporating gelatin grafted with a hydrophilic monomer into an ink-absorbing layer provided on a support. Further, by incorporating gelatin grafted with a hydrophilic monomer into an ink-absorbing layer, tackiness of a printed part can be further lessened.

Gelatin grafted with a hydrophilic monomer can effectively absorb a high boiling point solvent generally contained in an ink for ink jet recording than gelatin which is not grafted.

As such a hydrophilic monomer, at least one hydrophilic monomer selected from the group consisting of acrylamide, N,N-dimethylacrylamide, N,N-diethylacrylamide, N-isopropylacrylamide, acryloylmorpholine and N-vinyl-2-pyrrolidone is preferable since it effectively absorbs a high boiling point solvent generally contained in an ink for ink jet recording, but the present invention is not limited thereto.

In the grafted gelatin, the proportion of a hydrophilic monomer is preferably from 5 to 300 wt %, more preferably from 50 to 200 wt %, to the weight of gelatin before grafted. If the proportion of the hydrophilic monomer is too high, water-resistance of a film becomes poor, and on the other hand, if the proportion of the hydrophilic monomer is too low, an effect of absorbing a high boiling point solvent becomes small.

Also in the case of gelatin grafted with a hydrophilic monomer of the present invention, by using at least one ammonium salt monomer as a hydrophilic monomer, fixation of a dye can be enhanced and damage of a recorded image by bleeding of the dye from a film by the action of water droplets can be prevented.

Further, in an ink jet recording material provided with an ink-absorbing layer containing gelatin grafted with a hydrophilic monomer on a support, water-resistance of a film can be more improved by crosslinking the grafted gelatin with a crosslinking agent.

Examples of the crosslinking agent used for crosslinking the gelatin grafted with a hydrophilic monomer include the above-mentioned various crosslinking agents, e.g. aldehyde type compounds, reactive halogen-containing compounds, ketone compounds such as diacetylcyclopentanedione, divinylsulfone, 5-acetyl-1,3-diacryloyl, reactive olefin-containing compounds, N-hydroxymethylphthalimide, N-methylol compounds, isocyanates, aziridine compounds, carbodiimide type compounds, epoxy compounds, isoxazole type compounds, halogenocarboxyaldehydes such as mucochloric acid, dioxane derivatives such as dihydroxydioxane and dichlorodioxane, blocked isocyanatesr active acyl compounds, inorganic crosslinking agents such as chrome alum and chrome trichloride, and the like, but the present invention should not be limited thereto.

Preferable examples of the epoxy type crosslinking agent include sorbitol polyglycidyl ether, sorbitan polyglycidyl ether, polyglycerol polyglycidyl ether, diglycerol polyglycidyl ether, glycerol polyglycidyl ether, triglycidyl tris(2-hydroxyethyl)isocyanate, trimethylolpropane polyglycidyl ether, resorcin diglycidyl ether, neopentyl glycol diglycidyl ether, 1,6-hexanediol diglycidyl ether, ethylene glycol diglycidyl ether, polyethylene glycol diglycidyl ether, propylene glycol diglycidyl ether, polypropylene glycol diglycidyl ether, polytetramethylene glycol diglycidyl ether, adipic acid diglycidyl ether, ortho-phthalic acid diglycidyl ether, hydroquinone diglycidyl ether, bisphenol S diglycidyl ether, terephthalic acid diglycidyl ether, dibromoneopentyl glycol diglycidyl ether, and the like, but the present invention should not be limited thereto.

Preferable examples of the aziridine type crosslinking agent include trimethylolpropane-tri-β-aziridinyl propionate, tetramethylolmethane-tri-β-aziridinyl propionate, N,N'-diphenylmethane-4,4'-bis(1-aziridinecarboxamide), N,N'-hexamethylene-1,6'-bis(1-aziridinecarboxamide), N,N'-toluene-2,4'-bis(1-aziridinecarboxamide), triethylenemelamine, bisisophthaloyl-1-(2-methylaziridine), and the like, but the present invention should not be limited thereto.

Particularly preferable examples of the crosslinking agent for crosslinking gelatin grafted with a hydrophilic monomer of the present invention include compounds expressed by the above general formula 1, and among the compounds of the general formula 1, compounds expressed by any of the above general formulas 2 to 4 are particularly preferable since they provide water-resistance and ink-absorptivity in good balance.

Further, compounds expressed by the above general formulas 5 and 6 are also preferable in the same manner as in the compounds of the general formula 1.

When crosslinking gelatin grafted with a hydrophilic monomer by a crosslinking agent, a monomer having various functional groups may be copolymerized with gelatin in order to further enhance water-resistance of an ink-receiving layer. For example, a monomer having a carboxyl group, an amino group and a hydroxyl group may be copolymerized as a constitution component for the gelatin grafted with a hydrophilic monomer.

The crosslinking agent is added to the gelatin grafted with a hydrophilic monomer in an amount of from 0.1 to 10 wt %, preferably from 0.2 to 5 wt %, to gelatin before grafted. If the crosslinking agent is less than 0.1 wt %, a satisfactory water-resistance can not be obtained, and on the other hand, if the amount of the crosslinking agent is more than 10 wt %, crosslinking proceeds too much so that such a highly crosslinked film is formed as to extremely lower an ink-absorbing capacity of an ink-absorbing layer and to cause bleeding of an ink from a solid-printed part.

Gelatin grafted with a hydrophilic monomer in the present invention can be synthesized by a known method, and examples of the method includes chain transfer method, graft polymerization method using a cerium salt as an initiator, graft polymerization method using various redox type initiators, and the like. Among them, a preferable method is radical chain transfer method using a chain transfer compound and a solvent in water or water/alcohol solvent. Further, chain transfer method using various initiators is most convenient and preferable, for example, as disclosed in Eur. Polym. J. 21(2), 195–199 (1985), J. Appl. Polym. Sci. 55, 1291–1299 (1995). The reason why gelatin is grafted, is considered that gelatin is composed of 18 kinds of various amino acids, the molecules of which contain various many active functional groups such as an amino group, a guanidino group, a carboxyl group, a phenolic hydroxyl group, a mercapto group and the like.

Gelatin is usually obtained from water-insoluble collagen as a starting material, which is obtained from animals, particularly pig skins, oxhides, ox bones or tendons, and the collagen is subjected to alkali treatment or acid treatment. Thus, examples of the gelatin include alkali-treated (lime treatment) gelatin, acid-treated gelatin, gelatin extracted with high pressure vapor, and the like, and further include deionized gelatin obtained by ion-exchanging them, low molecular gelatin decomposed with an enzyme or the like. Further, there are other various gelatin derivatives, for example, as disclosed in JP-B-38-4854, JP-B-39-5514, JP-B-40-12237, JP-B-42-26345, U.S. Pat. No. 2,525,753, No. 2,594,293, No. 2,614,928, No. 2,763,639, No. 3,118,766, No. 3,132,945, No. 3,186,846 and No. 3,312,553, and British Patents No. 861414 and No. 1033189.

As the gelatin used in the present invention, these known gelatins may be used respectively alone or in combination, but the present invention should not be limited thereto.

The ammonium salt monomer used in the present invention is preferably a quaternary ammonium salt having four hydrocarbon groups bonded to a nitrogen atom, but an ammonium salt monomer in which a tertiary amine or a secondary amine is protonated to be cationic under acidic condition may also be used.

Examples of such an ammonium salt monomer include tertiary and secondary amines such as 2-(N,N-dimethylamino)ethylacrylate, 2-(N,N-diethylamino) ethylacrylate, 3-(N,N-dimethylamino)propylacrylate, 3-(N, N-diethylamino)propylacrylate, 3-(N,N-dimethylamino) propylacrylamide, 3-(N,N-diethylamino)propylacrylamide, 2-(N,N-dimethylamino)ethylmethacrylate, 2-(N,N-diethylamino)ethylmethacrylate, 3-(N,N-dimethylamino) propylmethacrylate, 3-(N,N-diethylamino) propylmethacrylate, 3-(N,N-dimethylamino) propylmethacrylamide, 3-(N,N-diethylamino) propylmethacrylamide, N,N,N-dimethyl-4-vinylbenzylamine, N,N,N-dimethyl-4-vinylbenzylamine, N,N-dimethylallylamine, N,N,N-diethylallylamine, N,N,N-dipropylallylamine, N,N,N-dibutylallylamine, N,N,N-dibenzylallylamine, N,N-diallylamine and the like; quarternized materials of the above tertiary and secondary amines by methyl chloride, ethyl chloride, benzyl chloride, methyl bromide, ethyl bromide, benzyl bromide, methyl iodide, ethyl iodide or benzyl iodide, such as methyl chloride adduct of 2-(N,N-dimethylamino)ethyl acrylate, methyl chloride adduct of 3-(N,N-dimethylamino) propylacrylamide, methyl chloride adduct of N,N,N-dimethyl-4-vinylbenzylamine, and the like; or their anion-substituted sulfonates, alkyl sulfonates, acetates or alkylcarboxylates, and the like, but the present invention should not be limited thereto.

Damage of recorded images is caused not only by water droplets but also by blocking of an ink-absorbing layer.

Blocking means a sticking phenomenon of a film to other materials, which is caused, for example, when a film of an ink-absorbing layer is attached to other materials such as papers and films. When the blocking occurs, an ink-absorbing layer is broken when peeling the blocked film off unless the film strength of the ink-absorbing layer is larger than the peeling strength. Also, in some cases, a support is broken.

In order to avoid such a blocking phenomenon, it is effective to make a contact area between a paper and a film by producing protruded parts on the surface of an ink-absorbing layer by incorporating fine particles into the ink-absorbing layer. However, when the fine particles are incorporated into the ink-absorbing layer, a gloss or a transparency of the ink-absorbing layer is impaired. Thus, in the case of a recording material having a photographic paper-like gloss or a transparent recording material usable as an OHP film, it is preferable for the purpose of maintaining the gloss and the transparency not to incorporate the fine particles into the ink-absorbing layer, but on the other hand, it is preferable for the purpose of avoiding the blocking phenomenon to incorporate the fine particles into the ink-absorbing layer.

A refractive index of an ink-absorbing layer containing no fine particles is usually in the range of from 1.45 to 1.65. When the refractive index of the ink-absorbing layer containing no fine particles is close to a refractive index of the fine particles, scattering of light becomes small even when the fine particles are incorporated into the ink-absorbing layer and the gloss and the transparency of the ink jet recording material is not substantially lowered.

On the other hand, when fine particles having a refractive index of higher than 1.7 are used, scattering of light becomes large and the gloss or the transparency of the ink-absorbing layer is unpreferably largely lowered.

Thus, in order to prevent the gloss or the transparency of the film from being lowered, it is preferable to use organic polymer fine particles having a refractive index of at most 1.7, particularly in the range of from 1.45 to 1.65, to be incorporated into an ink-absorbing layer.

In order to avoid blocking, organic polymer fine particles should have a particle size larger than a thickness of an ink-absorbing layer so that protruded parts can be produced on the surface of the ink-absorbing layer, and if not so, a contact area between paper or film and other materials can not be made smaller. Generally, an ink-absorbing layer can not fully absorb ink unless its thickness is at least 5 μm. Accordingly, the fine particles should have a particle size of larger than 5 μm and larger than a thickness of the ink-absorbing layer. On the other hand, even in case that the thickness of the ink-absorbing layer is too large, its ink-absorptivity does not substantially change, and in such a case, curl is sometimes generated. Therefore, the thickness of the ink-absorbing layer should be preferably at most 30 μm, more preferably at most 20 μm. On the other hand, if the fine particles are too large, the surface of the ink-absorbing layer becomes unpreferably rough, and therefore their particle size should be preferably at most 40 μm.

In the same manner as in the case of using organic polymer fine particles, damage of recorded images by blocking can be effectively prevented without substantially impairing a gloss or a transparency by incorporating inorganic pigment fine particles having a refractive index of at most 1.7 into an ink-absorbing layer.

Unlike organic polymer fine particles, amorphous silica fine particles tend to migrate to the vicinity of interface between an ink-absorbing layer and a gas layer during the steps of coating a coating solution containing amorphous silica fine particles on a support and drying to form an ink-absorbing layer. Therefore, when amorphous silica is used as inorganic pigment fine particles, it is not always necessary to use fine particles having a particle size larger than a thickness of an ink-absorbing layer for producing protrusions on the surface of the ink-absorbing layer to prevent blocking. However, if the fine particles are too small, a contact area between paper or film and other materials can not be made smaller. Thus, amorphous silica fine particles should have a particle size of preferably at least 2 μm. On the other hand, if the amorphous silica fine particles are too large, the surface of the ink-absorbing layer becomes undesirably rough, and therefore, the amorphous silica fine particles should have a particle size of preferably at most 20 μm.

Generally, amorphous silica is dispersed in a medium such as water not as a single particle but as an agglomeration state. Therefore, in the present invention, the size of amorphous silica fine particles is expressed by an average agglomerate particle size.

It is usual to measure an average agglomerate particle size by pore-passing method (coulter counter method).

If an amount of organic polymer fine particles or inorganic pigment fine particles is too large, a gloss or a transparency is undesirably lowered, and on the other hand, the amount is too small, an anti-blocking property is undesirably lowered. Accordingly, in order to maintain a satisfactory gloss or transparency of an ink-absorbing layer and to provide a satisfactory anti-blocking property, the amount of organic polymer fine particles or inorganic pigment fine particles should be in the range of from 10 $mg/mr^2$ to 1 $g/m^2$, more preferably in the range of 20 $mg/m^2$ to 200 $mg/m^2$.

Various materials can be used as organic polymer fine particles or inorganic pigment fine particles having a refractive index of at most 1.7. Examples of the organic high molecular fine particles include urea-formalin resin (refractive index 1.54–1.56), urea-thiourea-formalin resin (refractive index 1.66), melamine-formalin resin (refractive index 1.57), benzoguanamine-formalin resin (refractive index 1.57), melamine-benzoguanamine-formalin resin (refractive index 1.57), polystyrene resin (refractive index 1.59), polymethylmethacrylate resin (refractive index 1.49), polyethylene resin (refractive index 1.55) and the like, and examples of the inorganic pigment fine particles include heavy or light calcium carbonate (refractive index 1.49–1.66), magnesium carbonate (refractive index 1.50), kaolin (refractive index 1.55), calcined clay (refractive index 1.60), talc (refractive index 1.57), calcium silicate (refractive index 1.5–1.6), silica (refractive index 1.4–1.5), aluminum hydroxide (refractive index 1.53), barium sulfate (refractive index 1.64), and the like, but the present invention should not be limited thereto.

When a sol prepared by dissolving gelatin in water has a concentration of at least 1 wt %, it is usually solidified to be a gel at a temperature of 10° C. In the preparation of an ink jet recording material of the present invention, it has been proved that a more satisfactory ink-absorptivity can be obtained in the case of drying and forming an ink-absorbing layer without gelling a gelatin portion (hot dry set film) than in the case of drying and forming after gelling (cold dry set film).

The term "set" used herein means the state wherein a film does not cause flowing, deformation or the like before evaporating a solvent at the time of film-forming. Accordingly, the term "hot dry set film" means a film formed without by way of the "set" state, and therefore strictly speaking, the expression "hot dry set film" is not correct. However, the terms "cold dry set film" and "hot dry set film" are commonly used expressions, and these expressions are used hereinafter in the present invention.

Thus, the expression "ink-absorbing layer formed by drying without gelling a coating solution" used in the present invention means "hot dry set film".

The reason why the hot dry set film has a satisfactory ink-absorptivity is considered to be based on the following grounds. Generally, when gel is formed, hydrophilic groups bonds to each other, and accordingly a lipophilic property appears. Actually, the gelled surface of gelatin containing a water component or a film surface obtained by drying after gelling becomes water-repellent. On the other hand, when a film surface is formed without gelling gelatin, hydrophilic groups do not bond to each other and therefore the film surface thus formed has a lower water-repellency and provides a more hydrophilic surface than a film surface obtained after gelling. Thus, a hot dry set film provides a surface having a more satisfactory wetting property. Consequently, when this film is used as an ink-absorbing layer, it is considered that ink droplets are appropriately spread due to the satisfactory wetting property of its surface and a recording material having a more satisfactory absorptivity can be obtained.

In the present invention, in order to obtain a hot dry set film, various methods can be used. Forces of causing gelling are considered to be hydrogen bonding, van der Waals force and the like, and it is necessary to remove or weaken these bonding forces. Examples of removing or weakening these forces include a method of adding a hydrogen bond inhibitor such as urea, salicylic acid, potassium thiocyanate and the like. Further, a convenient method for reducing a crystallized part of a film is to add an alcohol type solvent to a coating solution in a sol state before coating.

In the present invention, a method for obtaining a hot dry set film most simply and surely is to carry out drying at a temperature of higher than a gelling temperature, preferably 5° C. higher than the gelling temperature. Thus, in the present invention, a drying temperature to obtain a hot dry set film is from 40° C. to 100° C., more preferably from 60° C. to 90° C., which is 5 to 8° C. higher than the gelling temperature of gelatin (generally 35° C.). Thus, when a coating solution for forming an ink-absorbing layer is coated on a support, the coating solution must be maintained at a temperature higher than the temperature at which the coating solution is gelled. The temperature is preferably at least 35° C., and it is necessary to maintain the coating temperature higher than this temperature during coating.

Generally, a hot dry set film is structurally unstable as compared with a cold dry set film. Most of hot dry set films have a random coil structure as mentioned above. This causes sol-gel transition under an environment of high humidity, and its structure is converted into a more stable helix structure. A high molecular chain does not substantially move under completely dry state, and such a change does not occur. However, there is a possibility that a hard copy medium such as an ink jet recording material is placed under various strict conditions, and it is therefore necessary to consider an influence by humidity. Thus, there is a concern about a humidity stability of a hot dry set film as a lapse of time.

In the present invention, in order to prevent a change in the humidity stability as a lapse of time, to strengthen a film strength and to obtain a film completely insoluble in water, it is preferable to crosslink gelatin or grafted gelatin with a crosslinking agent, i.e. to fix the random coil state of the hot dry set film by crosslinking. By this manner, the stability to moisture as a lapse of time is improved and the film strength of an ink-absorbing layer is enhanced.

In the preparation of an ink jet recording material of the present invention, examples of a support used, include generally polyester film, resin-coated paper, coat paper and the like, but any support which can be provided with an ink-absorbing layer, such as glass, aluminum foil, cloth, non-woven cloth, vapor-deposited paper, vapor-deposited film and the like, may be used, and are not specially limited.

An ink-absorbing layer is provided at least on one side of a support, but may be provided on both sides of a support in order to prevent curl.

When a polyester film is used as a support in the present invention, its thickness is not specially limited, but it is preferably from 10 to 200 $\mu$m in view of handling property and delivery through a printer.

In the present invention, examples of the polyester film include a polyester film obtained by polycondensing an aromatic dicarboxylic acid such as terephthalic acidr isophthalic acid and naphthalene dicarboxylic acid or its ester with a polyhydric alcohol such as ethylene glycol, diethylene glycol, 1,4-butanediol and neopentyl glycol, and this film is usually subjected to such an orientation treatment as roll stretching tenter stretching, inflation stretching or the like.

More particular examples of polyester include polyethylene terephthalate, polyethylenebutylene terephthalate, polyethylene-2,6-naphthalate and their copolymers with other components, but the present invention is not limited thereto.

When a white polyester film is used as a support, a whiteness of the polyester film can be enhanced by a method of incorporating an inorganic fine particle of barium sulfate, titanium dioxide, calcium carbonate, silicon dioxide, aluminum oxider kaolint talc or the like into the inside of the polyester film or by a method of coating a white paint on the surface.

In order to provide a cushion property and a concealing property, a cavity-containing film containing many cavities in the inside of the film, such as a foamed polyester film and the like, may be used. When a resin-coated paper is used as a support in the present invention, its thickness is not specially limited, but is preferably from 50 to 300 $\mu$m in view of handling property and conveying property through a printer. Further, in order to obtain a photographic paper-like feeling, its thickness is preferably from 200 to 300 $\mu$m.

A base paper for a resin-coated paper is not specially limited and a paper generally used may be used, but such a smooth base paper as used for a substrate of a photographic paper, is preferable. Examples of pulps for preparing a base paper include natural pulp, regenerated pulp, synthetic pulp and the like, and these pulps may be used respectively alone or in a mixture of two or more. The base paper contains additives such as a sizing agent, a paper strength-reinforcing agent, a filler, an antistatic agent, a fluorescent brightener, a dye or the like, which are generally used for manufacturing papers. Further, the surface of the base paper may be coated with a surface sizing agent, a surface paper strength-reinforcing agent, a fluorescent whitening agent, an antistatic agent, a dye, an anchoring agent or the like.

The base paper of a resin-coated paper preferably has a Beck smoothness of at least 200 seconds measured in accordance with JIS-P-8119, and the surface smoothness can be obtained by loading a pressure by a calender or the like during or after making paper. Its paper weight is preferably from 30 to 250 g/m$^2$.

When a base paper having a Hunter whiteness of at least 65% measured by JIS-P-8123 is used for a resin-coated paper, its whiteness is high and a recording material having a high-grade feeling can be obtained, but a whiteness may be varied depending on an aimed object, and a brown base paper using unbleached pulp as a natural pulp may be used in combination. Further, a base paper colored by a coloring agent such as a dye or the like may be used.

Examples of a coating resin for a resin-coated paper include preferably a polyolefin resin, more preferably a polyethylene resin. Further, a low density polyethylene, an intermediate density polyethylene, a high density polyethylene or their mixture may be used. The low density polyethylene used herein has a density of from 0.915 to 0.930 g/cm$^3$, and is prepared generally by high-pressure method. On the other hand, the high density polyethylene has a density of at least 0.950 g/cm$^3$, and is prepared generally by low-pressure method or medium-pressure method.

These polyethylene resins having various densities and melt flow rates may be used respectively alone or in a mixture of two or more.

The structure of the resin layer for a resin-coated paper may be any of a single layer and a multi-layer of two or more. In such a case, the above-mentioned polyolefin resins may be used respectively alone or in a mixture of two or more. Also, the composition of each layer of the multi-layer may be the same or different. The resin layer of multi-layer may be formed by any of co-extrusion coating method and sequential coating method.

On the other hand, the resin layer for a resin-coated paper may be formed by coating a film-formable latex. For example, the resin layer can be formed by coating a latex having a low MFT (minimum film-forming temperature) on a base paper for a resin-coated paper and then heating the coated paper at a temperature of higher than the minimum film-forming temperature.

The thickness of the coated resin layer of a resin-coated paper is not specially limited, but is generally from 5 to 50 $\mu$m, and it may be coated on the front or on both the front and back sides.

The resin of a resin-coated layer may appropriately contain a white pigment such as titanium oxide, zinc oxide, talc and calcium carbonate, aliphatic acid amides such as stearic acid amide and arachidic acid amide, aliphatic acid metal salts such as zinc stearate, calcium stearate, aluminum stearate and magnesium stearate, Irganox 1010, Irganox 1076, and the like as an antioxidant, a blue pigment or dye such as cobalt blue, ultramarine blue, cesilian blue and phthalocyanine blue, a magenta pigment or dye such as cobalt violet, fast violet and manganese purple, and various additives such as a fluorescent brightener and an UV ray absorber, and they are added appropriately in combination.

A resin-coated paper used as a support in the present invention is prepared by coating a heat-melted polyolefin resin on a running base paper by extrusion coating method. In order to improve adhesiveness between the resin and the base paper, it is preferable to subject the base paper to an activation treatment such as corona discharge treatment or flame treatment before coating the resin on the base paper. The side of a support, on which an ink-absorbing layer is coated (front side), has a glossy surface or a mat surface depending on its aimed object, and preferably has a glossy surface. It is not always necessary to coat the back side with a resin, but it is preferable for preventing curl to coat the resin. The back side is usually a non-glossy surfacer and the front side or both the front and back sides, if necessary, may be subjected to an activation treatment such as corona discharge treatment or flame treatment.

The present invention relates also to a highly transparent ink jet recording material usable as an OHP film, but for such a recording material as an OHP film which requires a satisfactory light-transmission property, not only the composition of an ink-absorbing layer but also the property of a support is important. The light-transmission property of an OHP film should be evaluated by haze (cloudiness) rather than the total light transmittance when considering human sense, and in order to obtain an ink jet recording material having a satisfactorily high transparency, it is preferable to provide an ink-absorbing layer at least on one side of a transparent support having a haze (cloudiness) value of at most 3.0 measured by JIS-K-7105.

A finally obtained ink jet recording material having an ink-absorbing layer on a support which is used as an OHP film, should preferably have a haze (cloudiness) value of at most 5.0 measured by JIS-K-7105.

According to JIS-K-7105, a haze (cloudiness) value is expressed by a ratio of a diffusion transmittance and a total light-transmittance measured by a measuring device of integrating sphere type light-transmittance.

In the recording material required to have a light-transmission property as an OHP film, the thickness of a support used is not specially limited, but is preferably from 50 to 200 $\mu$m in view of handling property and delivery through a printer.

In the preparation of an ink jet recording material of the present invention, a satisfactory coating property can be often obtained without adding a surfactant, but in order to further improve the coating property, a surfactant may be added for the purpose of regulating a dot diameter when an ink is deposited on an ink-absorbing layer. The surfactant used may be any type of anionic, cationic, nonionic and betaine type surfactants, and may be any of low molecular and high molecular surfactants. The surfactant may be used alone or in a mixture of two or more. The amount of the surfactant is preferably from 0.001 g to 5 g, more preferably from 0.01 to 3 g, in a solid content, to 100 g of a binder which constitutes an ink-absorbing layer.

Further, in addition to the above surfactant, an ink-absorbing layer may contain a coloring dye, a coloring pigment, a fixing agent for ink dye, a UV ray absorber, and antioxidant, a dispersant for pigment, a defoaming agent, a leveling agent, an antiseptic agent, a fluorescent brightener, a viscosity stabilizer, a pH regulator, and other known various additives.

Still further, in order to improve a resolving power of an image, an ink-absorbing layer may contain a fluoro-resin type, silicone resin type or alkylketene dimer type water repellent or sizing agent to control a printed dot diameter, thus improving a resolving power of an image. Commercially available materials can be used for these fluoro resin type, silicone resin type or alkylketene dimer type water repellent or sizing agent. They are usable either as a solution or as an aqueous emulsion. A printed dot diameter can be controlled by the amount of the water repellent to be added to the ink-absorbing layer. The amount may be varied depending on the concentration of each component and a desired printed dot diameter, but is usually from 0.05 to 10 wt %, preferably from 0.1 to 5 wt %, in an effective solid content, to the total solid content of the ink-absorbing layer.

Examples of a method for coating an ink-absorbing layer coating solution in the present invention, include slide hopper type, curtain type, extrusion type, air knife type, roll coating type and rod bar coating type coating methods which are usually used.

In order to improve adhesiveness between an ink-absorbing layer and a support, the support used in the present invention may be provided with an anchor layer. The anchor layer may contain a hydrophilic binder such as gelatin, a solvent-soluble binder such as butyral, a latex, a crosslinking agent, a pigment, a surfactant and the like, and they may be added appropriately in combination.

The support of the present invention may be provided with various back coat layers to provide antistatic property, conveying property, curl-preventing property, writability, sizing property or the like. the back coat layer may contain an inorganic static agent, an organic static agent, a hydrophilic binder, a latex, a crosslinking agent, a pigment, a lubricant, a surfactant or the like, and they may be added appropriately in combination.

Now, the present invention will be described in further detail with reference to Examples. However, it should be understood that the present invention is not limited to such specific Examples. The term "part" used herein means "part by weight".

PREPARATION EXAMPLES

Hereinafter, preparation of crosslinking agents and grafted gelatins used in the present invention are illustrated by the following Preparation Examples, but the present invention should not be limited thereto.

Preparation Example 1

Preparation of crosslinking agent of compound No. 1-4:

25 g of 4-methylimidazole was dissolved in 500 ml of acetone at 25° C., and 25 g of hexamethylene diisocyanate was dropwise added thereto under cooling with ice. The resultant mixture was reacted at 25° C. for 5 hours under stirring, and a precipitated product was taken out by filtration. The product thus obtained was washed with acetone, and was dried to obtain 40 g of white powder having a melting point of 92° C.

Preparation Example 2

Preparation of crosslinking agent of compound No. 3-3:

13.7 g of imidazole was dissolved in 250 ml of acetone, and 16.8 g of hexamethylene diisocyanate was dropwise added thereto under cooling with ice. The resultant mixture was stirred at 0 to 5° C. for 30 minutes, and was further stirred at 25° C. for 2 hours. Acetone was distilled off under a reduced pressure, and a product was then recrystallized with acetone and was dried to obtain 30 g of white powder having a melting point of 105° C.

Preparation Example 3

Preparation of crosslinking agent of compound No. 6-1:

20 g of succinimide was dissolved in 300 ml of dioxane, and 17 g of adipic acid chloride was added thereto at 60° C., and 20 g of triethylamine was dropwise added thereto. After stirring the resultant mixture at 60° C. for 4 hours, a precipitated white product was immediately filtrated out. Acetone was distilled off from the filtrate under a reduced pressure, and a product was then recrystallized with methanol and was dried to obtain 7 g of white powder having a melting point of 156° C.

Preparation Example 4

Preparation of crosslinking agent of compound No. 9-3:

27.2 g of imidazole was dissolved in 300 ml of tetrahydrofuran, and 25.6 g of tetramethylene disulfonic acid dichloride was dropwise added thereto under cooling with ice. The resultant mixture was stirred at 0 to 5° C. for 30 minutes, and was further stirred at 25° C. for 3 hours. About 200 ml of tetrahydrofuran was distilled off under a reduced pressure, and 1000 ml of cold water was poured therein, and a precipitated product was taken out by filtration. The product was then recrystallized with methanol and was dried to obtain 23 g of white powder having a melting point of 154° C.

Preparation Example 5

Preparation of crosslinking agent of compound No. 10-6:

400 ml of anhydrous toluene was cooled at 20 to 25° C., and 49.5 g of phosgene was gently introduced therein. To the resultant solution, was dropwise added under stirring a solution prepared by dissolving 107 g of a distillation purification product of N-methylaniline in 450 mg of anhydrous toluene, and the resultant mixture was heated to 80 to 90° C. and was stirred for 30 minutes. After cooling, a precipitated material was filtrated out and toluene was distilled off from the filtrate under a reduced pressure to obtain 81 g of a crystal of phenyl-methyl-carbamoyl chloride.

33.9 g of phenyl-methyl-carbamoyl chloride obtained by the above method was added to 400 ml of pyridine, and the resultant mixture was stirred. The mixture was stirred at room temperature for 4 hours, and 400 ml of ether was added thereto, and a precipitated material was taken out by filtration. The precipitated product thus obtained was dissolved in ethanol, and was reprecipitated with ether to obtain 41 g of white powder having a melting point of 109° C.

Preparation Example 6

Preparation of crosslinking agent of compound No. 14-3:

19 g of 1-hydroxypyridine was dissolved in 250 ml of acetone, and 16 g of hexamethylene diisocyanate was dropwise added thereto under cooling with ice. After stirring the resultant mixture at 0 to 5° C. for 30 minutes, the mixture was further stirred at 25° C. for 3 hours. Acetone was distilled off under a reduced pressure, and a product was then recrystallized with isopropyl ether and was dried to obtain 29 g of white powder having a melting point of 87° C.

Preparation Example 7

Preparation of grafted gelatin:

100 g of gelatin (jelly strength measured by PAGI method: 350 bloom, isoelectric point: 7.8) was mixed with 800 g of ion-exchanged water, and the mixture was allowed to stand for about 30 minutes to fully swell gelatin. Thereafter, to the swollen gelatin dispersion, was added 100 g of N-vinyl-2-pyrrolidone, and a container containing the resultant mixture was warmed in a hot bath (fixed at 60° C.), and the content was subjected to deoxygenation operation with dry nitrogen gas for 10 minutes under stirring. When the liquid temperature reached 60° C., polymerization was initiated in the presence of 0.5 g of V-50 (water-soluble azo type polymerization initiator, manufactured by Wako Junyaku K.K.) as a polymerization initiator. After about 1 hour, when the reaction temperature passed peak (about 70° C.), the liquid temperature was fixed at 70° C. and polymerization was conducted for about 6 hours in total from the initiation of polymerization. Thereafter, the polymerization reaction was stopped to obtain an aqueous solution of gelatin-graft copolymer.

Thereafter, the copolymer aqueous solution was poured into acetone, and unpolymerized N-vinyl-2-pyrrolidone and ungrafted poly(N-vinyl-2-pyrrolidone) were dissolved therein, and the resultant mixture was filtrated and an acetone-insoluble material taken out by filtration was vacuum-dried. The dried material thus obtained was subjected to GPC and IR analyses and was identified to be gelatin grafted with N-vinyl-2-pyrrolidone.

Example 1

70 Parts of 10% warm aqueous solution (temperature: about 40° C.) of gelatin (jelly strength measured by PAGI method: 260 bloom, isoelectric point: 7.8) was diluted with 29 parts of warm water (temperature: about 40° C.), and 1 part of 3.5% isopropyl alcohol solution of compound No. 1-4 crosslinking agent was added thereto to prepare a coating solution. The coating solution thus prepared was maintained at a temperature of 35 to 40° C., and was coated on a transparent polyester film (Melinex 705 manufactured by ICI Ltd. (Imperial Chemical Industries Limited)) having a surface treated to be easily adhesive, so as to provide a dry coated amount of 9 $g/m^2$, and was immediately cooled by pressing a metal roll of about 0° C. to the back side of the polyester film to rapidly gel the coated solution, and the coated layer was mildly dried at 30 to 60° C. The coated layer thus obtained was allowed to stand at a temperature of 50° C. for 1 day and night to obtain an ink jet recording material.

Examples 2 to 6

Five kinds of ink jet recording materials were obtained in the same manner as in Example 1, except that the compound No. 1-4 crosslinking agent of Example 1 was replaced respectively by compound No. 3-3 crosslinking agent (Example 2), compound No. 6-1 crosslinking agent (Example 3), compound No. 9-3 crosslinking agent (Example 4), compound No. 10-6 crosslinking agent (Example 5) and compound No. 14-3 crosslinking agent (Example 6).

Example 7

An ink jet recording material was obtained in the same manner as in Example 1, except that a white polyester film (U2 manufactured by Teijin Ltd.) was used in place of the transparent polyester film of Example 1 and the surface of the white polyester film was corona-treated and a coating solution was coated on the corona-treated surface and dried.

Example 8

An ink jet recording material was obtained in the same manner as in Example 1, except that the transparent polyester film of Example 1 was replaced by the following resin-coated paper, the surface of which was corona-treated, and a coating solution was coated on the corona-treated surface and dried.

(Preparation of resin-coated paper)

A resin-coated paper was prepared from a basic paper of LBKP having a weight of 100 $g/m^2$, the surface of which was coated with a resin composition comprising 85 parts by weight of low-density polyethylene and 15 parts by weight of titanium dioxide in a coated amount of 25 $g/m^2$ and the back side of which was coated with a resin composition comprising 50 parts by weight of high-density polyethylene and 50 parts by weight of low-density polyethylene in a coated amount of 20 $g/m^2$.

Comparative Example 1

An ink jet recording material was obtained in the same manner as in Example 1, except that the compound No. 1-4 crosslinking agent of Example 1 was omitted.

Comparative Example 2

An ink jet recording material was obtained in the same manner as in Example 1, except that mucochloric acid was used in place of the compound No. 1-4 crosslinking agent of Example 1.

Comparative Example 3

An ink jet recording material was obtained in the same manner as in Example 1, except that a 3.5% aqueous solution of chrome alum was used in place of the 3.5 isopropyl alcohol solution of compound No. 1-4 crosslinking agent of Example 1.

(Evaluation-1)

Printing was conducted respectively on the ink jet recording materials obtained in Examples 1 to 8 and Comparative Examples 1 to 3 by means of a full color ink jet printer BJC-610J manufactured by Canon K.K. The printed recording materials were evaluated in accordance with the following methods (Tests 1 to 4), and the results are shown in the following Table 16.

(Test 1) Image quality: A solid-printed part was visually observed to judge presence or absence of unevenness. A sample having no unevenness on a two color double solid-printed part was evaluated by mark ○, a sample having no unevenness on a single color solid-printed but having an unevenness on a two color double solid-printed part was evaluated by mark Δ, and a sample having an unevenness on a single color solid-printed part was evaluated by mark x.

(Test 2) Water-resistance of film: A waterdrop was dropped on an unprinted part, and after 5 minutes, the waterdrop was absorbed by paper to visually observe the state of a film of an ink-absorbing layer. A sample having a film undissolved was evaluated by mark ○, a sample having a film slightly dissolved but not completely dissolved was evaluated by mark Δ, and a sample having a film completely dissolved was evaluated by mark x.

(Test 3) Water-resistance of dye: A waterdrop was dropped on a magenta solid-printed part, and after 30 seconds, the waterdrop was absorbed by paper to visually observe deposition of the dye to the paper and decrease in the image density of the printed part. A sample having no deposition of the dye to the paper was evaluated by mark ○, a sample having the dye deposited to the paper but not causing decrease in the image density of the printed part was evaluated by mark Δ, and a sample causing substantial decrease in the image density of the printed part was evaluated by mark x. Test was not carried out with regard to the sample evaluated to be mark x in the above Test 2 concerning water-resistance of film.

(Test 4) Haze (cloudiness): Haze (cloudiness) of an unprinted part was measured by a glossmeter (NDH-300A manufactured by Nippon Denshoku Kogyo K.K.) in accordance with JIS-K-7105 method. When a recording material is used as an OHP film, haze of an unprinted part should be preferably at most 5.0, and when the haze exceeds 5.0, a projected image becomes dark.

(Test 5) Glossiness: A 60° specular gloss of a white part was measured by a glossmeter (VGS-300A manufactured by Nippon Denshoku Kogyo K.K.) in accordance with JIS-Z-8741 method. In order to provide a photographic paper-like surface, it is preferable that a non-image part should have a 60° specular gloss of at least 70.

TABLE 16

| | Image quality | Water-resistance of film | Water-resistance of dye | Haze | Glossiness |
|---|---|---|---|---|---|
| Example 1 | ○ | ○ | Δ | 3.1 | — |
| Example 2 | ○ | ○ | Δ | 3.1 | — |
| Example 3 | ○ | ○ | Δ | 3.4 | — |
| Example 4 | ○ | ○ | Δ | 3.5 | — |
| Example 5 | Δ | ○ | Δ | 3.4 | — |
| Example 6 | Δ | ○ | Δ | 3.4 | — |
| Example 7 | ○ | ○ | Δ | — | 93 |
| Example 8 | ○ | ○ | Δ | — | 90 |
| Comparative Example 1 | ○ | x | — | 3.1 | — |
| Comparative Example 2 | Δ | Δ | x | 3.6 | — |
| Comparative Example 3 | x | ○ | x | 3.4 | — |

Example 9

70 Parts of a 10% warm aqueous solution (temperature: about 40° C.) of gelatin used in Example 1 was diluted with 29 parts of warm water (about 40° C.), and the above prepared gelatin warm aqueous solution was mixed with 100 parts of a 7% aqueous solution of polyvinyl pyrrolidone (Luviskol K-90 manufactured by BASF A.G.) heated to about 40° C., and 1 part of a 3.5% isopropyl alcohol solution of compound No. 1-4 crosslinking agent was further added thereto to prepare a coating solution. The coating solution thus prepared was maintained at a temperature of 35 to 40° C., and was coated on a transparent polyester film (Melinex D535 manufactured by ICI Ltd.) having a surface treated to be easily adhesive, so as to provide a dry coated amount of 9 $g/m^2$ and was dried in the same manner as in Example 1. The film thus coated was allowed to stand at 40° C. for 1 day and night to obtain an ink jet recording material.

Examples 10 to 14

Five kinds of ink jet recording materials were obtained in the same manner as in Example 9, except that the compound No. 1-4 crosslinking agent used in Example 9 was replaced respectively by compound No. 3-3 crosslinking agent (Example 10), compound No. 6-1 crosslinking agent (Example 11), compound No. 9-3 crosslinking agent (Example 12), compound No. 10-6 crosslinking agent (Example 13) and compound No. 14-3 crosslinking agent (Example 14).

Example 15

An ink jet recording material was obtained in the same manner as in Example 9, except that 100 parts of the 7% aqueous solution of polyvinyl pyrrolidone used in Example 9 was replaced by 100 parts of a mixture solution of 90 parts of a 7% aqueous solution of polyvinyl pyrrolidone and 10 parts of a 7% aqueous solution of polyacrylamide.

Example 16

An ink jet recording material was obtained in the same manner as in Example 9, except that the polyvinyl pyrrolidone (Luviskol K-90, average molecular weight: about 630,000, manufactured by BASF A.G.) used in Example 9 was replaced by polyvinyl pyrrolidone (Luviskol K-30, average molecular weight: about 38,000, manufactured by BASF A.G.).

Examples 17 to 20

Six kinds of ink jet recording materials were obtained in the same manner as in Example 9, except that the polyvinyl pyrrolidone used in Example 9 was replaced respectively by the following hydrophilic polymers.

(EXAMPLE 17) Poly(N,N-dimethylacrylamide)

(EXAMPLE 18) N,N-dimethylacrylamide/N,N-diethylacrylamide/N-vinyl-2-pyrrolidone (weight ratio 60/20/20) copolymer (EXAMPLE 19) Polyacryloylmorpholine (EXAMPLE 20) N,N-dimethylacrylamide/N-isopropylacrylamide (weight ratio 70/30) copolymer Example 21

An ink jet recording material was obtained in the same manner as in Example 9, except that the transparent polyester film used in Example 9 was replaced by a white polyester film (Melinex D534, manufactured by ICI Ltd.).

Example 22

An ink jet recording material was obtained in the same manner as in Example 9, except that the transparent polyester film used in Example 9 was replaced by a resin-coated paper used in Example 8, the surface of which was corona-treated in the same manner as in Example 8, and a coating solution was coated on the corona-treated surface and was dried.

Comparative Example 4

An ink jet recording material was obtained in the same manner as in Example 9, except that the compound No. 1-4 crosslinking agent used in Example 9 was omitted.

Comparative Example 5

An ink jet recording material was obtained in the same manner as in Example 9, except that mucochloric acid was used in place of the compound No. 1-4 crosslinking agent used in Example 9.

Comparative Example 6

An ink jet recording material was obtained in the same manner as in Example 9, except that a 3.5% aqueous solution of chrome alum was used in place of the 3.5% isopropyl alcohol solution of compound No. 1-4 crosslinking agent used in Example 9.

(Evaluation-2)

Printing was carried out respectively on the ink jet recording materials obtained in Examples 9 to 22 and Comparative Examples 4 to 6 by a full color ink jet printer BJC-610J manufactured by Canon K.K. The printed materials were evaluated in the same manner as in (Evaluation-1), and the results are shown in the following Table 17.

TABLE 17

| | Image quality | Water-resistance of film | Water-resistance of dye | Haze | Glossiness |
|---|---|---|---|---|---|
| Example 9 | ○ | ○ | Δ | 4.2 | — |
| Example 10 | ○ | ○ | Δ | 4.4 | — |
| Example 11 | ○ | ○ | Δ | 4.1 | — |
| Example 12 | ○ | ○ | Δ | 4.6 | — |
| Example 13 | ○ | ○ | Δ | 4.5 | — |
| Example 14 | ○ | ○ | Δ | 4.8 | — |
| Example 15 | ○ | ○ | Δ | 4.5 | — |
| Example 16 | ○ | Δ | Δ | 4.0 | — |
| Example 17 | ○ | ○ | Δ | 3.7 | — |
| Example 18 | ○ | ○ | Δ | 4.2 | — |
| Example 19 | ○ | ○ | Δ | 4.5 | — |
| Example 20 | ○ | ○ | Δ | 4.4 | — |
| Example 21 | ○ | ○ | Δ | — | 87 |
| Example 22 | ○ | ○ | Δ | — | 82 |
| Comparative Example 4 | ○ | x | — | 4.1 | — |
| Comparative Example 5 | Δ | Δ | x | 4.6 | — |
| Comparative Example 6 | x | ○ | x | 4.4 | — |

Example 23

70 Parts of a 10% warm aqueous solution (temperature: about 40° C.) of gelatin used in Example 1 was diluted with 29 parts of warm water (about 40° C.), and 100 parts of a 7% aqueous solution of carboxymethyl cellulose (Cellogen 5A manufactured by Daiichi Kogyo Seiyaku Co., Ltd.) heated to about 40° C. was mixed with the above gelatin warm aqueous solution, and 1 part of a 3.5% isopropyl alcohol solution of compound No. 1-4 crosslinking agent was further added thereto to prepare a coating solution. The coating solution thus prepared was maintained at a temperature of 35 to 40° C., and was coated on a transparent polyester film (Melinex D535 manufactured by ICI Ltd.) having a haze (cloudiness) of 0.5 measured by JIS-K-7105 and having a surface treated to be easily adhesive, so as to provide a dry coated amount of 9 $g/m^2$ and was dried in the same manner as in Example 1. The coated film was then allowed to stand at about 40° C. for 1 day and night to obtain an ink jet recording material.

Examples 24 to 28

Five kinds of ink jet recording materials were obtained in the same manner as in Example 23, except that the compound No. 1-4 crosslinking agent used in Example 23 was replaced respectively by compound No. 3-3 crosslinking agent (Example 24), compound No. 6-1 crosslinking agent (Example 25), compound No. 9-3 crosslinking agent (Example 26), compound No. 10-6 crosslinking agent (Example 27) and compound No. 14-3 crosslinking agent (Example 28).

Comparative Example 7

An ink jet recording material was obtained in the same manner as in Example 23, except that the compound No. 1-4 crosslinking agent used in Example 23 was omitted.

Comparative Example 8

An ink jet recording material was obtained in the same manner as in Example 23, except that mucochloric acid was used in place of the compound No. 1-4 crosslinking agent used in Example 23.

Comparative Example 9

An ink jet recording material was obtained in the same manner as in Example 23, except that a 3.5% aqueous solution of chrome alum was used in place of the 3.5% isopropyl alcohol solution of compound No.1-4 crosslinking agent used in Example 23.

(Evaluation-3)

Printing was carried out on the ink jet recording materials obtained in Examples 23 to 28 and Comparative Examples 7 to 9 by a full color ink jet printer BJC-610J manufactured by Canon K.K. The printed recording materials were evaluated in accordance with Tests 1 to 4 of (Evaluation-1), and the results are shown in the following Table 18.

TABLE 18

| | Image quality | Water-resistance of film | Water-resistance of dye | Haze |
|---|---|---|---|---|
| Example 23 | ○ | ○ | Δ | 3.7 |
| Example 24 | ○ | ○ | Δ | 3.7 |
| Example 25 | ○ | ○ | Δ | 3.8 |
| Example 26 | ○ | ○ | Δ | 3.6 |
| Example 27 | ○ | ○ | Δ | 3.8 |
| Example 28 | ○ | ○ | Δ | 3.8 |
| Comparative Example 7 | ○ | x | — | 3.7 |
| Comparative Example 8 | Δ | Δ | x | 3.8 |
| Comparative Example 9 | x | ○ | x | 3.7 |

Example 29

70 Parts of a 10% warm aqueous solution (temperature: about 40° C.) of gelatin used in Example 1 was diluted with 29 parts of warm water (temperature: about 40° C.), and 90 parts of a 7% warm aqueous solution (temperature: about 40° C.) of polyvinyl pyrrolidone (Luviskol K-90 manufactured by BASF A.G.) was mixed therewith. Thereafter, to the resultant mixture, was added 10 parts of a 7% warm aqueous solution (temperature: about 40° C.) of N,N-dimethylacrylamide/N-(3-dimethylaminopropyl) acrylamide-methyl chloride adduct (weight ratio 60/40) copolymer, which is a hydrophilic polymer having an ammonium salt monomer as a constitution unit, and 1 part of a 3.5% isopropyl alcohol solution of compound No. 1-4 crosslinking agent was further added thereto to prepare a coating solution. The coating solution thus prepared was maintained at a temperature of 35 to 40° C., and was coated on a transparent polyester film (Melinex D535 manufactured by ICI Ltd.) having a surface treated to be easily adhesive, so as to provide a dry coated amount of 9 g/$m^2$ and was dried in the same manner as in Example 1. The coated film was allowed to stand at about 40° C. for 1 day and night to obtain an ink jet recording material.

Examples 30 and 31

Two kinds of ink jet recording materials were obtained in the same manner as in Example 29, except that the N,N-dimethylacrylamide/N-(3-dimethylaminopropyl) acrylamide-methyl chloride adduct (weight ratio 60/40) used in Example 29 was replaced by the following hydrophilic polymers having an ammonium salt monomer as a constitution unit.

(EXAMPLE 30) Sumirez resin 1001 (manufactured by Sumitomo Chemical Co., Ltd.)

(EXAMPLE 31) Hymo P601 (manufactured by Harima Chemicals Inc.)

Comparative Example 10

An ink jet recording material was obtained in the same manner as in Example 29, except that the compound No. 1-4 crosslinking agent used in Example 29 was omitted.

Comparative Example 11

An ink jet recording material was obtained in the same manner as in Example 29, except that mucochloric acid was used in place of the compound No. 1-4 crosslinking agent used in Example 29.

Comparative Example 12

An ink jet recording material was obtained in the same manner as in Example 29, except that a 3.5% aqueous solution of chrome alum was used in place of the 3.5% isopropyl alcohol solution of compound No.1-4 crosslinking agent used in Example 29.

(Evaluation-4)

Printing was carried out on the ink jet recording materials obtained in Examples 29 to 31 and Comparative Examples 10 to 12 by a full color ink jet printer BJC-610J manufactured by Canon K.K. The printed materials were evaluated in accordance with Tests 1 to 4 of (Evaluation-1), and the results are shown in the following Table 19.

TABLE 19

| | Image quality | Water-resistance of film | Water-resistance of dye | Haze |
|---|---|---|---|---|
| Example 29 | ○ | ○ | ○ | 4.6 |
| Example 30 | ○ | ○ | ○ | 4.7 |
| Example 31 | ○ | ○ | ○ | 4.9 |
| Comparative Example 10 | ○ | x | — | 4.7 |
| Comparative Example 11 | Δ | Δ | Δ | 4.8 |
| Comparative Example 12 | x | ○ | Δ | 4.6 |

Example 32

0.3 Part of tetramethylolmethane-tri-β-aziridinyl propionate as an aziridine type-crosslinking agent was added to 200 parts of a 15% warm aqueous solution (temperature: about 40° C.) of grafted gelatin prepared by Preparation Example 7 to obtain a coating solution. The coating solution thus obtained was maintained at a temperature of 35 to 40° C., and was coated on the following resin-coated paper having a surface corona-treated, so as to provide a dry coated amount of 15 g/$m^2$ on the corona-treated surface. The coated solution still having a fluidity was immediately dried by a hot air dryer at 80° C. for 10 minutes, and the film thus coated was allowed to stand at about 40° C. for 1 day and night to obtain an ink jet recording material.

(Preparation of resin-coated paper)

The surface of a base paper having a weight of 170 g/$m^2$ comprising LBKP was coated with a resin composition comprising 85 parts by weight of low-density polyethylene and 15 parts by weight of titanium dioxide in an amount of 25 g/$m^2$, and the back side of the paper was coated with a resin composition comprising 50 parts by weight of high-density polyethylene and 50 parts by weight of low-density polyethylene in an amount of 25 g/$m^2$ to produce a resin-coated paper.

Examples 33 to 41

Nine kinds of ink jet coating materials were obtained in the same manner as in Example 32, except that the grafted polymer used in Example 32 was replaced respectively by the following grafted gelatins. All of the grafted gelatins were prepared in the same manner as in Preparation Example 7.

(EXAMPLE 33) Grafted product of gelatin/N-vinyl-2-pyrrolidone/3-(N,N-dimethylamino)propylacrylamide-methyl chloride adduct (weight ratio 50/47.5/2.5)

(EXAMPLE 34) Grafted product of gelatin/N-vinyl-2-pyrrolidone/3-(N,N-dimethylamino)propylacrylamide-methyl chloride adduct/acrylic acid (weight ratio 50/46.5/2.5/1.0)

(EXAMPLE 35) Grafted product of gelatin/N-vinyl-2-pyrrolidone/3-(N,N-dimethylamino)propylacrylamide-methyl chloride adduct (weight ratio 35/62.5/2.5)

(EXAMPLE 36) Grafted product of gelatin/N-vinyl-2-pyrrolidone/3-(N,N-dimethylamino)propylacrylamide-methyl chloride adduct (weight ratio 70/27.5/2.5)

(EXAMPLE 37) Grafted product of gelatin/acrylamide (weight ratio 50/50)

(EXAMPLE 38) Grafted product of gelatin/N,N-dimethylacrylamide/3-(N,N-dimethylamino)propylacrylamide-methyl chloride adduct (weight ratio 50/40/10)

(EXAMPLE 39) Grafted product of gelatin/N,N-dimethylacrylamide/3-(N,N-diethylamino)propylacrylamide-methyl chloride adduct (weight ratio 50/40/10)

(EXAMPLE 40) Grafted product of gelatin/N-isopropylacrylamide/3-(N,N-diethylamino)propylacrylamide-methyl chloride adduct (weight ratio 50/45/5)

(EXAMPLE 41) Grafted product of gelatin/acryloylmorpholine (weight ratio 50/50)

Example 42

An ink jet recording material was prepared in the same manner as in Example 32, except that the drying temperature 80° C. used in Example 32 was changed to 60° C.

Example 43

An ink jet recording material was prepared in the same manner as in Example 32, except that the tetramethylolmethane-tri-β-aziridinyl propionate used in Example 32 was replaced by ethylene glycol diglycidyl ether (epoxy type crosslinking agent).

Example 44

An ink jet recording material was prepared in the same manner as in Example 32, except that the tetramethylolmethane-tri-β-aziridinyl propionate used in Example 32 was omitted.

Example 45

An ink jet recording material was prepared in the same manner as in Example 32, except that the resin-coated paper used in Example 32 was replaced by a white polyester film (ULY-125 manufactured by Teijin Ltd.) having a surface treated to be easily adhesive.

Example 46

An ink jet recording material was prepared in the same manner as in Example 32, except that the resin-coated paper used in Example 32 was replaced by a transparent polyester film (Cronar manufactured by E.I. Du Pont de Nemours and Company) having a surface treated to be easily adhesive.

Comparative Example 13

100 parts of a 15% warm aqueous solution (temperature: about 40° C.) of gelatin (jelly strength measured by PAGI method: 350 bloom, isoelectric point: 7.8) was mixed with 100 parts of a 15% warm aqueous solution (temperature: about 40° C.) of polyvinyl pyrrolidone, and 0.3 part of tetramethylolmethane-tri-β-aziridinyl propionate (aziridine type crosslinking agent) was added to the resultant mixture to prepare a coating solution. The coating solution thus prepared was maintained at a temperature of 35 to 40° C., and was coated on a resin-coated paper used in Example 32, the surface of which was corona-treated, so as to provide a dry-coated amount of 15 g/$m^2$ on the corona-treated surface. The film thus coated was allowed to stand under conditions of 25° C. and humidity (RH) of 55% for 10 minutes to have the coated layer gelled. The coated film was then dried by a hot air dryer at 30° C., and was allowed to stand at a temperature of about 40° C. for 1 day and night to prepare an ink jet recording material.

Comparative Example 14

100 parts of a 15% warm aqueous solution (temperature: about 40° C.) of gelatin (jelly strength measured by PAGI method: 350 bloom, isoelectric point: 7.8), 95 parts of a 15% warm aqueous solution (temperature: about 40° C.) of polyvinyl pyrrolidone and a 15% warm aqueous solution (temperature: about 40° C.) of a homopolymer of N-(3-dimethylaminopropyl)acrylamide-methyl chloride adduct having an ammonium salt monomer as a constitution unit were mixed, and 0.3 part of tetramethylolmethane-tri-β-aziridinyl propionate (aziridine type crosslinking agent) was added to the resultant mixture to prepare a coating solution. The coating solution thus prepared was coated on the surface of a resin-coated paper used in Example 32 so as to provide a dry coated amount of 15 g/$m^2$ and was dried, in the same manner as in Comparative Example 13. The film thus coated was allowed to stand at a temperature of about 40° C. for 1 day and night to prepare an ink jet recording material.

Comparative Example 15

An ink jet recording material was prepared in the same manner as in Comparative Example 14, except that 95 parts of the 15% warm aqueous solution (temperature: about 40° C.) of polyvinyl pyrrolidone used in Comparative Example 14 was replaced by 95 parts of a 15% warm aqueous solution (temperature: about 40° C.) of polyvinyl pyrrolidone/acrylic acid (weight ratio 98/2) copolymer.

Comparative Example 16

An ink jet recording material was prepared by using a coating solution prepared in Comparative Example 13 in the same manner as in Example 32.

Comparative Example 17

An ink jet recording material was prepared in the same manner as in Comparative Example 13, except that the drying temperature of 30° C. used in Comparative Example 13 was changed to 60° C.

Comparative Example 18

An ink jet recording material was prepared in the same manner as in Comparative Example 13, except that tetramethylolmethane-tri-β-aziridinyl propionate used in Comparative Example 13 was omitted.

Comparative Example 19

An ink jet recording material was prepared in the same manner as in Comparative Example 13, except that polyvinyl alcohol (PVA117 manufactured by Kuraray Co., Ltd.) was used in place of the polyvinyl pyrrolidone used in Comparative Example 13.

Comparative Example 20

An ink jet recording material was prepared in the same manner as in Comparative Example 13, except that polyhydroxyethyl methacrylate was used in place of the polyvinyl pyrrolidone used in Comparative Example 13.

Comparative Example 21

An ink jet recording material was prepared in the same manner as in Comparative Example 13, except that the resin-coated paper used in comparative Example 13 was replaced by a white polyester film (ULY-125 manufactured by Teijin Ltd.) having a surface treated to be easily adhesive.

Comparative Example 22

An ink jet recording material was prepared in the same manner as in Comparative Example 13, except that the resin-coated paper used in comparative Example 13 was replaced by a transparent polyester film (Cronar manufactured by E.I. Du Pont de Nemours and Company) having a surface treated to be easily adhesive.

Comparative Example 23

An ink jet recording material was prepared in the same manner as in Comparative Example 32, except that a 15% aqueous solution of polyvinyl pyrrolidone was used as a coating solution in place of the coating solution used in Example 32.

Comparative Example 24

An ink jet recording material was prepared in the same manner as in Comparative Example 32, except that a 15% aqueous solution of polyvinyl alcohol was used as a coating solution in place of the coating solution used in Example 32.

Comparative Example 25

0.1 Part of tetramethylolmethane-tri-β-aziridinyl propionate (aziridine type crosslinking agent) was added to 100 parts of a 15% warm aqueous solution (temperature: about 40° C.) of gelatin (jelly strength measured by PAGI method: 350 bloomr isoelectric point; 7.8) to prepare a coating solution. The coating solution thus prepared was coated on the surface of a resin-coated paper used in Example 32 so as to provide a dry coated amount of 15 g/$m^2$ and was dried in the same manner as in Example 32. The film thus coated was allowed to stand at a temperature of about 40° C. for 1 day and night to prepare an ink jet recording material.

(Evaluation-5)

Printing of 720 dpi mode was carried out respectively on the ink jet recording materials obtained in Examples 32 to 46 and Comparative Examples 13 to 25 by a full color ink jet printer MJ-80° C. manufactured by Seiko Epson K.K. The printed papers were evaluated in accordance with tests 1, 2, 4 and 5 of (Evaluation-1) and the following Tests 6 to 10, and the results are shown in the following Tables 20 to 21.

(Test 6) Water-resistance of dye: A waterdrop was dropped on each of yellow-, cyan-, magenta- and black-solid-printed parts, and after 30 seconds, the waterdrop was absorbed by a paper to visually observe deposition of the dye to the paper and decrease in the image density of the printed part. A sample providing no deposition of the dye to the paper was evaluated by mark ○, a sample providing deposition of the dye to the paper but causing substantially no decrease in the image density of the printed part was evaluated by mark Δ, and a sample causing a substantial decrease in the image density of the printed part was evaluated by mark x. With regard to a sample evaluated by mark x in the above Test 2 for water-resistance of film, Test 6 was not carried out.

(Test 7) Film strength: A film strength was evaluated by visually observing a roll trace of a paper-feeding roll having a printer equipped therein (gear-like roll). Since an ink-absorbing layer is placed to a paper-feeding roll immediately after printing, a roll trace occurs on the surface of the ink-absorbing layer if a film strength is weak. A sample having no roll trace on both a printed part and an unprinted part was evaluated by mark ○, a sample having a roll trace on a printed part but having no roll trace on an unprinted part was evaluated by mark Δ, and a sample having a roll trace on both a printed part and an unprinted part was evaluated by mark x.

(Test 8) Bleeding under high humidity: A magenta single color was printed so as to be a square of 2.5×2.5 $cm^2$ in the form of an independent ink drop, and a reflective or transmissive optical density of the printed part was measured by a Macbeth densitometer (TR-1224). Thereafter, the printed sample was allowed to stand under conditions of 40° C. and 80% RH for 24 hours, and an optical density of the printed part was measured. A bleeding ratio (%) was measured in accordance with the following calculation formula 1. When the bleeding ratio is closer to 100%, a dye fixing property (bleeding under high humidity) is considered to be satisfactory. Calculation formula 1

$$A(\%)=(B/C)\times 100$$

A: Bleeding ratio (unit %)

B: Optical density of printed part after allowed to stand under conditions of 40° C. and 80% RH for 24 hours C: Optical density of printed part immediately after printed (Test 9) Preservability under high humidity: An unprinted sample was allowed to stand under conditions of 40° C. and 80% RH for 3 days, and the sample was then solid-printed with a yellow, cyan, magenta or black ink. An image quality of the sample thus printed was compared with an image quality of a printed sample ("image quality" described in evaluation item) which was not allowed to stand under the above conditions. A preservability under high humidity of a sample, the image quality of which did not substantially change, was evaluated by mark ○, a sample, the image quality of which slightly changed, was evaluated by mark Δ, and a sample, the image quality of which substantially changed and became poor, was evaluated by mark x.

(Test 10) Tackiness and ink drying property: Hands were washed fully with a soap, and water droplets were completely removed by a paper towel. A tackiness was evaluated by touching an unprinted part and a printed part after a lapse of 5 minutes (a black solid-printed part) with a finger. If a drying property of an ink is poor, a tackiness of the printed part becomes large even when a tackiness of the unprinted part is small. A sample, the tackiness of which was small on both a printed part and an unprinted part, was evaluated by mark ○, a sample, the tackiness of which was large on a printed part but small on an unprinted part, was evaluated by mark Δ, and a sample, the tackiness of which was large on both a printed part and an unprinted part, was evaluated by mark x.

TABLE 20

| Examples | Image quality | Glossiness White | Glossiness Solid print-ing | Film strength | Water-resistance of film | Bleeding ratio (%) | Water-resistance of dye | Preserva-bility under high humidity | Tackiness | Haze |
|---|---|---|---|---|---|---|---|---|---|---|
| 32 | ○ | 95 | 85 | ○ | ○ | 105 | Δ | ○ | ○ | — |
| 33 | ○ | 98 | 90 | ○ | ○ | 105 | ○ | ○ | ○ | — |
| 34 | ○ | 97 | 89 | ○ | ○ | 104 | ○ | ○ | ○ | — |
| 35 | ○ | 97 | 90 | ○ | ○ | 108 | ○ | ○ | ○ | — |
| 36 | ○ | 90 | 82 | ○ | ○ | 103 | ○ | ○ | ○ | — |
| 37 | ○ | 92 | 83 | ○ | ○ | 102 | ○ | ○ | ○ | — |
| 38 | ○ | 88 | 80 | ○ | ○ | 115 | ○ | ○ | ○ | — |
| 39 | ○ | 86 | 80 | ○ | ○ | 112 | ○ | ○ | ○ | — |
| 40 | ○ | 87 | 81 | ○ | ○ | 106 | ○ | ○ | ○ | — |
| 41 | ○ | 108 | 99 | ○ | ○ | 102 | ○ | ○ | ○ | — |
| 42 | ○ | 93 | 87 | ○ | ○ | 106 | ○ | ○ | ○ | — |
| 43 | ○ | 95 | 88 | ○ | ○ | 105 | ○ | ○ | ○ | — |
| 44 | ○ | 98 | 88 | ○ | Δ | 105 | ○ | Δ | ○ | — |
| 45 | ○ | 110 | 100 | ○ | ○ | 105 | ○ | ○ | ○ | — |
| 46 | ○ | — | — | ○ | ○ | 104 | ○ | ○ | ○ | 4.0 |

TABLE 21

| Comp. Examples | Image quality | Glossiness White | Glossiness Solid print-ing | Film strength | Water-resistance of film | Bleeding ratio (%) | Water-resistance of dye | Preserva-bility under high humidity | Tackiness | Haze |
|---|---|---|---|---|---|---|---|---|---|---|
| 13 | x | 58 | 52 | ○ | Δ | 131 | x | ○ | ○ | — |
| 14 | x | 62 | 57 | ○ | Δ | 125 | Δ | ○ | ○ | — |
| 15 | x | 61 | 55 | ○ | ○ | 126 | Δ | ○ | ○ | — |
| 16 | Δ | 75 | 61 | ○ | Δ | 129 | x | ○ | ○ | — |
| 17 | x | 66 | 58 | ○ | Δ | 126 | x | ○ | ○ | — |
| 18 | x | 59 | 53 | ○ | Δ | 130 | x | x | ○ | — |
| 19 | x | 70 | 63 | ○ | Δ | 122 | x | x | ○ | — |
| 20 | x | 59 | 55 | ○ | Δ | 120 | x | Δ | ○ | — |
| 21 | x | 70 | 60 | ○ | Δ | 130 | x | ○ | ○ | — |
| 22 | x | — | — | ○ | Δ | 129 | x | ○ | ○ | 9.0 |
| 23 | Δ | 93 | 85 | x | x | 138 | x | ○ | x | — |
| 24 | x | 95 | 82 | Δ | x | 133 | x | x | Δ | — |
| 25 | x | 70 | 62 | ○ | ○ | 104 | Δ | ○ | ○ | — |

Example 47

A coating solution was prepared by adding 1 part of a 3.5% isopropyl alcohol solution of compound No. 1-4 crosslinking agent to a 7% warm aqueous solution (temperature: about 40° C.) of a grafted gelatin prepared by Preparation Example 7. The coating solution thus prepared was maintained at a temperature of 35 to 40° C., and was coated on a transparent polyester film (Melinex 705 manufactured by ICI Ltd.) having a surface treated to be easily adhesive and having a haze (cloudiness) of 0.4 measured by ASTM-D1003, so as to provide a dry coated amount of 9 g/$m^2$ and was dried, in the same manner as in Example 1. The film thus coated was allowed to stand at a temperature of about 40° C. for 1 day and night to obtain an ink jet recording material.

Examples 48 to 52

Ink jet recording materials were obtained in the same manner as in Example 47, except that the compound No. 1-4 crosslinking agent was replaced respectively by compound No. 3-3 crosslinking agent (Example 48), compound No. 6-1 crosslinking agent (Example 49), compound No. 9-3 crosslinking agent (Example 50), compound No. 10-6 crosslinking agent (Example 51) and compound No. 14-3 crosslinking agent (Example 52).

Examples 53 to 58

Six kinds of ink jet coating materials were obtained in the same manner as in Example 47, except that the grafted gelatin used in Example 47 was replaced respectively by the following grafted gelatins.

(EXAMPLE 53) Grafted product of gelatin/N-vinyl-2-pyrrolidone (weight ratio 70/30)

(EXAMPLE 54) Grafted product of gelatin/N,N-dimethylacrylamide (weight ratio 50/50)

(EXAMPLE 55) Grafted product of gelatin/N,N-dimethylacrylamide/N,N-diethylacrylamide (weight ratio 50/25/25)

(EXAMPLE 56) Grafted product of gelatin/acryloylmorpholine (weight ratio 50/50)

(EXAMPLE 57) Grafted product of gelatin/N,N-dimethylacrylamide/N-isopropylacrylamide (weight ratio 50/30/20)

(EXAMPLE 58) Grafted product of gelatin/N-vinyl-2-pyrrolidone/3-(N,N-dimethylamino)propylacrylamide-methyl chloride adduct (weight ratio 50/40/10)

Example 59

An ink jet recording material was obtained in the same manner as in Example 471 except that a white polyester film (Melinex 339 manufactured by ICI Ltd.) was used in place of the transparent polyester film used in Example 47.

Example 60

An ink jet recording material was obtained in the same manner as in Example 47, except that the transparent polyester film used in Example 47 was replaced by a resin-coated paper used in Example 8, the surface of which was corona-treated, and a coating solution was coated on the corona-treated surface and dried.

(Evaluation-6)

Printing was carried out on each of the ink jet recording materials obtained in Examples 47 to 60 by using a full color ink jet printer BJC-610J manufactured by Canon K.K. The printed materials were evaluated in the same manner as in (Evaluation-1), and the results are shown in the following Table 22.

TABLE 22

| | Image quality | Water-resistance of film | Water-resistance of dye | Haze | Glossiness |
|---|---|---|---|---|---|
| Example 47 | ○ | ○ | Δ | 3.8 | — |
| Example 48 | ○ | ○ | Δ | 3.6 | — |
| Example 49 | ○ | ○ | Δ | 3.1 | — |
| Example 50 | ○ | ○ | Δ | 3.6 | — |
| Example 51 | ○ | ○ | Δ | 4.0 | — |
| Example 52 | ○ | ○ | Δ | 3.8 | — |
| Example 53 | ○ | ○ | Δ | 3.8 | — |
| Example 54 | ○ | ○ | Δ | 3.9 | — |
| Example 55 | ○ | ○ | Δ | 3.7 | — |
| Example 56 | ○ | ○ | Δ | 3.7 | — |
| Example 57 | ○ | ○ | Δ | 3.6 | — |
| Example 58 | ○ | ○ | ○ | 3.8 | — |
| Example 59 | ○ | ○ | Δ | — | 92 |
| Example 60 | ○ | ○ | Δ | — | 89 |

Example 61

70 Parts of a 10% warm aqueous solution (temperature: about 40° C.) of gelatin used in Example 1 was diluted with 29 parts of warm water (temperature: about 40° C.), and 1 part of a 3.5% isopropyl alcohol solution of compound No. 1-4 crosslinking agent having 0.04 part of organic polymer fine particles of crosslinked methyl polymethacrylate (MBX-20, weight average particle size 20 $\mu$m, refractive index 1.49, manufactured by Sekisui Plastics Co., Ltd.) dispersed, was added to the above prepared warm aqueous solution of gelatin to prepare a coating solution. The coating solution thus prepared was maintained at a temperature of 35 to 40° C., and was coated on a transparent polyester film (Melinex D535 manufactured by ICI Ltd.) having a surface treated to be easily adhesive, so as to provide a dry coated amount of 9 g/$m^2$ and was dried, in the same manner as in Example 1. The film thus coated was allowed to stand at a temperature of about 40° C. for 1 day and night to obtain an ink jet recording material.

Example 62

70 Parts of a 10% warm aqueous solution (temperature: about 40° C.) of gelatin used in Example 1 was diluted with 29 parts of warm water (temperature: about 40° C.). 100 Parts of a 7% aqueous solution of polyvinyl pyrrolidone (Luviskol K-90 manufactured by BASF A.G.) heated to about 40° C. was mixed with the above prepared warm aqueous solution of gelatin. To the resultant mixture solution, was further added a dispersion prepared by dispersing 0.04 part of organic polymer fine particles of crosslinked polystyrene (SBX-12, weight average particle size 12 $\mu$m, refractive index 1.59, manufactured by Sekisui Plastics Co., Ltd.) in 1 part of a 3.5% isopropyl alcohol solution of compound No. 1-4 crosslinking agent, to obtain a coating solution. The coating solution thus obtained was maintained at a temperature of 35 to 40° C., and was coated on a transparent polyester film (Melinex D535 manufactured by ICI Ltd.) having a surface treated to be easily adhesive, so as to provide a dry coated amount of 9 g/$m^2$ and was dried, in the same manner as in Example 1. The film thus coated was allowed to stand at a temperature of about 40° C. for 1 day and night to obtain an ink jet recording material.

Examples 63 to 67

Five kinds of ink jet recording materials were obtained in the same manner as in Example 62, except that the compound No. 1-4 crosslinking agent used in Example 62 was replaced respectively by compound No. 3-3 crosslinking agent (Example 63), compound No. 6-1 crosslinking agent (Example 64), compound No. 9-3 crosslinking agent (Example 65), compound No. 10-6 crosslinking agent (Example 66) and compound No. 14-3 crosslinking agent (Example 67).

Example 68

An ink jet recording material was obtained in the same manner as in Example 61, except that a 7% warm aqueous solution of a grafted gelatin prepared by Preparation Example 7 was used in placed of the gelatin warm aqueous solution used in Example 61 which was prepared by diluting 70 parts of a 10% warm aqueous solution (temperature: about 40° C.) of gelatin with 29 parts of warm water (about 40° C.).

Comparative Example 26

An ink jet recording material was obtained in the same manner as in Example 62, except that the compound No. 1-4 crosslinking agent used in Example 62 was omitted.

Comparative Example 27

An ink jet recording material was obtained in the same manner as in Example 62, except that mucochloric acid was used in place of the compound No. 1-4 crosslinking agent used in Example 62.

Comparative Example 28

An ink jet recording material was obtained in the same manner as in Example 62, except that a 3.5% aqueous solution of chrome alum was used in place of the 3.5% isopropyl alcohol solution of compound No. 1-4 crosslinking agent used in Example 62.

(Evaluation-7)

Printing was carried out on each of the ink jet recording materials obtained in Examples 61 to 68 and Comparative Examples 26 to 28 by using a full color ink jet printer BJC-610J manufactured by Canon K.K. The printed samples were evaluated in accordance with Tests 1 to 4 of (Evaluation-1) and the following Test 11, and the results are shown in the following Table 23.

(Test 11) Blocking: A plain paper (Mitsubishi PPC paper manufactured by Mitsubishi Paper Mills Limited) was placed on a magenta solid-printed part, and a weight of 5 kg was imposed at an area of 10 cm×10 cm on the plain paper. After 30 seconds, the plain paper was peeled off, and the blocking state was evaluated. When the plain paper was peeled off, a sample showing no blocking or showing blocking but having no blocking trace remained on an ink-absorbing layer film was evaluated by mark ○, a sample having a blocking trace remained on an ink-absorbing layer film was evaluated by mark Δ, and a sample in which the plain paper was broken or an ink-absorbing layer was transferred to the plain paper when the plain paper was peeled off, was evaluated by mark x.

TABLE 23

| | Image quality | Water-resistance of film | Water-resistance of dye | Haze | Blocking |
|---|---|---|---|---|---|
| Example 61 | ○ | ○ | Δ | 4.5 | Δ |
| Example 62 | ○ | ○ | Δ | 4.7 | ○ |
| Example 63 | ○ | ○ | Δ | 4.5 | ○ |
| Example 64 | ○ | ○ | Δ | 4.6 | ○ |
| Example 65 | ○ | ○ | Δ | 4.7 | ○ |
| Example 66 | ○ | ○ | Δ | 4.2 | Δ |
| Example 67 | ○ | ○ | Δ | 4.6 | Δ |
| Example 68 | ○ | ○ | Δ | 3.6 | ○ |
| Comparative Example 26 | ○ | x | — | 4.5 | x |
| Comparative Example 27 | Δ | Δ | x | 4.6 | Δ |
| Comparative Example 28 | x | ○ | x | 4.5 | x |

Example 69

70 Parts of a 10% warm aqueous solution (temperature: about 40° C.) used in Example 1 was diluted with 29 parts of warm water (about 40° C.), and 1 part of a 3.5% isopropyl alcohol solution of compound No. 1-4 crosslinking agent having 0.04 part of inorganic oxide fine particles of silica (Mizukasil P-78F, average agglomerate particle size 12.5 μm, refractive index 1.46, manufactured by Mizusawa Industrial Chemicals, Ltd.) dispersed, was added to the above warm aqueous solution of gelatin to prepare a coating solution. The coating solution thus prepared was maintained at a temperature of 35 to 40° C., and was coated on a transparent polyester film (Melinex D535 manufactured by ICI Ltd.) having a surface treated to be easily adhesive, so as to provide a dry coated amount of 9 g/$m^2$, and was dried, in the same manner as in Example 1. The film thus coated was allowed to stand at about 40° C. for 1 day and night to obtain an ink jet recording material.

Example 70

An ink jet recording material was obtained in the same manner as in Example 69, except that inorganic oxide fine particles (Finesil X37, average agglomerate particle size 2.6 μm, refractive index 1.46, manufactured by Tokuyama Corporation) was used in place of the inorganic oxide fine particles (Mizukasil P-78F, average agglomerate particle size 12.5 μm, refractive index 1.46, manufactured by Mizusawa Industrial Chemicals, Ltd.) used in Example 69.

Example 71

70 Parts of a 10% warm aqueous solution (temperature: about 40° C.) of gelatin used in Example 1 was diluted with 29 parts of warm water (about 40° C.). 100 Parts of a 7% aqueous solution of polyvinyl pyrrolidone (Luviskol K-90 manufactured by BASF A.G.) was heated to about 40° C., and was mixed with the above warm aqueous solution of gelatin. To the resultant mixture solution, was further added a dispersion of 1 part of a 3.5% isopropyl alcohol solution of compound No. 3-3 crosslinking agent having 0.04 part of inorganic oxide fine particles (Mizukasil P-78F, average agglomerate particle size 12.5 $\mu$m, refractive index 1.46, manufactured by Mizusawa Industrial Chemicals, Ltd.) dispersed, to obtain a coating solution. The coating solution thus obtained was maintained at a temperature of 35 to 40° C., and was coated on a transparent polyester film (Melinex D535 manufactured by ICI Ltd.) having a surface treated to be easily adhesive, so as to provide a dry coated amount of 9 g/$m^2$, and was dried, in the same manner as in Example 1. The film thus coated was allowed to stand at about 40° C. for 1 day and night to obtain an ink jet recording material.

Examples 72 to 75

Four kinds of ink jet recording materials were obtained in the same manner as in Example 71, except that the compound No. 3-3 crosslinking agent was replaced respectively by compound No. 6-1 crosslinking agent (Example 72), compound No. 9-3 crosslinking agent (Example 73), compound No. 10-6 crosslinking agent (Example 74) and compound No. 14-3 crosslinking agent (Example 75).

Example 76

An ink jet recording material was obtained in the same manner as in Example 61, except that inorganic oxide fine particles of calcium carbonate (Callite-KT, calcite type, refractive index 1.49–1.66, manufactured by Shiraishi Central Laboratories Co., Ltd.) was used in place of the organic high molecular fine particles of crosslinked polystyrene used in Example 61.

Comparative Example 29

An ink jet recording material was obtained in the same manner as in Example 69, except that the compound No. 1-4 crosslinking agent used in Example 69 was omitted.

Comparative Example 30

An ink jet recording material was obtained in the same manner as in Example 69, except that mucochloric acid was used in place of the compound No. 1-4 crosslinking agent used in Example 69.

Comparative Example 31

An ink jet recording material was obtained in the same manner as in Example 69, except that a 3.5% aqueous solution of chromium alum was used in place of the 3.5% isopropyl alcohol solution of compound No.1-4 crosslinking agent used in Example 69.

Comparative Example 32

An ink jet recording material was obtained in the same manner as in Example 69, except that the compound No. 1-4 crosslinking agent used in Example 69 was omitted and that zinc oxide (Sazex No. 3, refractive index 2.01, manufactured by Sakai Chemical Industry Co., Ltd.) was used in place of the inorganic oxide fine particles of silica used in Example 69.

(Evaluation-8)

Printing was carried out on each of the ink jet recording materials obtained in Examples 69 to 76 and Comparative Examples 29 to 32 by using a full color ink jet printer BJC-610J manufactured by Canon K.K. The printing evaluation was made in the same manner as in (Evaluation-7), and the results are shown in the following Table 24.

TABLE 24

| | Image quality | Water-resistance of film | Water-resistance of dye | Haze | Blocking |
|---|---|---|---|---|---|
| Example 69 | ○ | ○ | Δ | 4.7 | ○ |
| Example 70 | ○ | ○ | Δ | 4.5 | Δ |
| Example 71 | ○ | ○ | Δ | 4.5 | ○ |
| Example 72 | ○ | ○ | Δ | 4.6 | ○ |
| Example 73 | ○ | ○ | Δ | 4.5 | ○ |
| Example 74 | ○ | ○ | Δ | 4.6 | Δ |
| Example 75 | ○ | ○ | Δ | 4.7 | Δ |
| Example 76 | ○ | ○ | Δ | 4.2 | ○ |
| Comparative Example 29 | ○ | x | — | 4.4 | x |
| Comparative Example 30 | Δ | Δ | x | 4.6 | Δ |
| Comparative Example 31 | x | ○ | x | 4.5 | x |
| Comparative Example 32 | ○ | x | — | 18.5 | x |

INDUSTRIAL APPLICABILITY

As evident from the above Examples, an ink jet recording material having a satisfactory photographic paper-like gloss required particularly for color recording or an ink jet recording material having a high transparency usable as an OHP film, could be provided.

Further, there could be provided a recording material which prevents dissolution of an ink-absorbing layer film by a waterdrop and bleeding of a dye from the film, which is excellent in water-resistance and anti-blocking property, which prevents breakage of a recorded image of a printed part by blocking and breakage of an ink-absorbing layer film, and which does not have such a tackiness of a printed part as to provide an unpleasant feeling when touched with a hand.

What is claimed is:

1. An ink jet recording material having an ink-absorbing layer on a support, characterized in that the ink-absorbing layer contains a gelatin crosslinked with at least one compound of the following general formula 1:

1

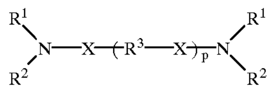

wherein X is a bivalent residue having a carbonyl group or a sulfonyl group bonded with an N-atom, $R^1$ and $R^2$ are respectively monovalent residues which may be the same or different and $R^1$ and $R^2$ may bond to each other to form a substituted or unsubstituted ring, $R^3$ is a bivalent residue, and p is an integer of 0 or 1.

2. The ink jet recording material according to claim 1, wherein the compound of the general formula 1 is at least one compound selected from the group consisting of compounds of any of the following general formulas 2 to 4:

2

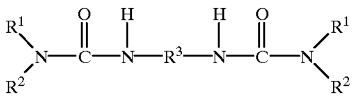

wherein $R^1$ to $R^3$ are as defined in the general formula 1,

3

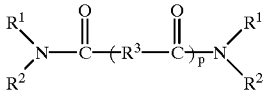

wherein $R^1$ to $R^3$ and p are as defined in the general formula 1, and

4

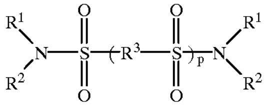

wherein $R^1$ to $R^3$ and p are as defined in the general formula 1.

3. An ink jet recording material having a ink-absorbing layer on a support, characterized in that the ink-absorbing layer contains a gelatin crosslinked with at least one compound of the following general formula 5:

5

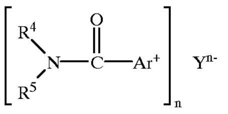

wherein $Ar^+$ is a substituted or unsubstituted 5-membered or 6-membered heteroaromatic group having a quaternary nitrogen atom, n is an integer of 1 to 3, $y^{n-}$ is an n-valent anion, and $R^4$ and $R^5$ are respectively monovalent residues which may be the same or different and $R^4$ and $R^5$ may bond to each other to form a substituted or unsubstituted ring.

4. An ink jet recording material having a ink-absorbing layer on a support, characterized in that the ink-absorbing layer contains a gelatin crosslinked with at least one compound of the following general formula 6:

6

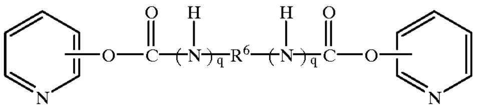

wherein $R^6$ is a bivalent residue and q is an integer of 0 or 1.

5. The ink jet recording material according to any one of claims 1 to 4, wherein the ink-absorbing layer contains at least one hydrophilic polymer in addition to a gelatin crosslinked with a crosslinking agent.

6. The ink jet recording material according to claim 5, wherein the hydrophilic polymer contains as a constitution unit at least one monomer selected from the group consisting of acrylamide, N,N-dimethylacrylamide, N,N-diethylacrylamide, N-isopropylacrylamide, acryloylmorpholine and N-vinyl-2-pyrrolidone.

7. The ink jet recording material according to claim 5, wherein the hydrophilic polymer is a water-soluble cellulose ether.

8. The ink jet recording material according to claim 5, wherein the hydrophilic polymer contains as a constitution unit at least one ammonium salt monomer.

9. An ink jet recording material having a ink-absorbing layer on a support, wherein the ink-absorbing layer contains a gelatin grafted with a hydrophilic monomer of at least one member selected from the group consisting of acrylamide, N,N-dimethylacrylamide, N,N-diethylacrylamide, N-isopropylacryalmide, acryloylmorpholine and N-vinyl-2-pyrrolidone.

10. The ink jet recording material according to claim 9, wherein the grafted gelatin contains at least one ammonium salt monomer as a constitution unit.

11. The ink jet recording material according to claim 9, wherein the grafted gelatin is crosslinked with a crosslinking agent.

12. The ink jet recording material according to claim 11, wherein the crosslinking agent is at least one compound selected from the group consisting of compounds of the general formulas 1,5 and 6 as follow:

1

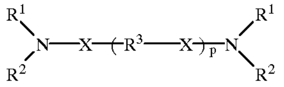

wherein X is a bivalent residue having a carbonyl group or a sulfonyl group bonded with an N-atom, $R^1$ and $R^2$ are respectively monovalent residues which may be the same or different and $R^1$ and $R^2$ may bond to each other to form a substituted or unsubstituted ring, $R^3$ is a bivalent residue, and p is an integer of 0 or 1:

5

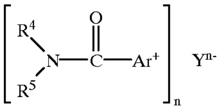

wherein $Ar^+$ is a substituted or unsubstituted 5-membered or 6-membered heteroaromatic group having a quaternary nitrogen atom, n is an integer of 1 to 3, $Y^{n-}$ is an n-valent anion, and $R^4$ and $R^5$ are respectively monovalent residues which may be the same or different and $R^4$ and $R^5$ may bond to each other to form a substituted or unsubstituted ring;

6

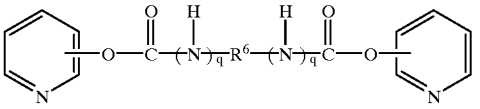

wherein $R^6$ is a bivalent residue and q is an integer of 0 or 1.

13. The ink jet recording material according to claim 1, wherein the ink-absorbing layer contains organic polymer fine particles comprising a resin having a refractive index of at most 1.7.

14. The ink jet recording material according to claim 1, wherein the ink-absorbing layer contains inorganic pigment fine particles having a refractive index of at most 1.7.

15. The ink jet recording material according to claim 14, wherein the inorganic pigment fine particles are amorphous silica having an average agglomerate particle size in the range of from 2 μm to 20 μm.

16. The ink jet recording material according to claim 1, wherein the ink-absorbing layer is formed by coating a coating solution on a support and drying the coating solution without gelling.

17. The ink jet recording material according to claim 6, wherein the hydrophilic polymer contains as a constitution unit at least one ammonium salt monomer.

18. The ink jet recording material according to claim 10, wherein the grafted gelatin is crosslinked with a crosslinking agent.

19. The ink jet recording material according to claim 12, wherein the compound of the general formula 1 is at least one compound selected from the group consisting of compounds of any of the following general formulae 2 to 4:

2

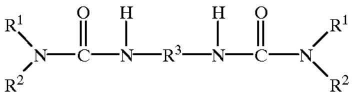

wherein $R^1$ to $R^3$ are as defined in the general formula 1,

3

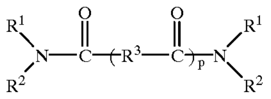

4

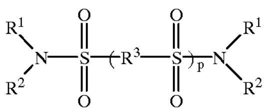

wherein $R^1$ to $R^3$ and p are as defined in the general formula 1.

20. The ink jet recording material according to claim 3, wherein the ink-absorbing layer contains organic polymer fine particles comprising a resin having a refractive index of at most 1.7.

21. The inkjet recording material according to claim 4, wherein the ink-absorbing layer contains organic polymer fine particles comprising a resin having a refractive index of at most 1.7.

22. The inkjet recording material according to claim 9, wherein the ink-absorbing layer contains organic polymer fine particles comprising a resin having a refractive index of at most 1.7.

23. The ink jet recording material according to claim 3, wherein the ink-absorbing layer contains inorganic pigment fine particles having a refractive index of at most 1.7.

24. The ink jet recording material according to claim 4, wherein the ink-absorbing layer contains inorganic pigment fine particles having a refractive index of at most 1.7.

25. The ink jet recording material according to claim 9, wherein the ink-absorbing layer contains inorganic pigment fine particles having a refractive index of at most 1.7.

26. The ink jet recording material according to claim 23, wherein the inorganic pigment fine particles are amorphous silica having an average agglomerate particle size in the range of from 2 μm to 20 μm.

27. The ink jet recording material according to claim 24, wherein the inorganic pigment fine particles are amorphous silica having an average agglomerate particle size in the range of from 2 μm to 20 μm.

28. The ink jet recording material according to claim 25, wherein the inorganic pigment fine particles are amorphous silica having an average agglomerate particle size in the range of from 2 μm to 20 μm.

29. The ink jet recording material according to claim 3, wherein the ink-absorbing layer is formed by coating a coating solution on a support and drying the coating solution without gelling.

30. The inkjet recording material according to claim 4, wherein the ink-absorbing layer is formed by coating a coating solution on a support and drying the coating solution without gelling.

31. The inkjet recording material according to claim 9, wherein the ink-absorbing layer is formed by coating a coating solution on a support and drying the coating solution without gelling.

* * * * *